United States Patent
Yang et al.

(10) Patent No.: US 11,864,228 B2
(45) Date of Patent: Jan. 2, 2024

(54) SIGNAL TRANSMISSION METHOD, COMMUNICATION DEVICE AND COMMUNICATION SYSTEM FOR ALLEVIATING HIDDEN NODES

(71) Applicant: ZTE CORPORATION, Guangdong (CN)

(72) Inventors: Ling Yang, Shenzhen (CN); Yajun Zhao, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 1102 days.

(21) Appl. No.: 16/324,856

(22) PCT Filed: Aug. 14, 2017

(86) PCT No.: PCT/CN2017/097416
§ 371 (c)(1),
(2) Date: May 13, 2019

(87) PCT Pub. No.: WO2018/028716
PCT Pub. Date: Feb. 15, 2018

(65) Prior Publication Data
US 2019/0268939 A1    Aug. 29, 2019

(30) Foreign Application Priority Data

Aug. 12, 2016  (CN) .......................... 201610664401.6

(51) Int. Cl.
*H04W 74/08* (2009.01)
*H04W 76/11* (2018.01)
(Continued)

(52) U.S. Cl.
CPC ....... *H04W 74/0808* (2013.01); *H04W 72/20* (2023.01); *H04W 72/23* (2023.01);
(Continued)

(58) Field of Classification Search
CPC ........... H04W 74/0808; H04W 72/042; H04W 72/1278; H04W 72/14; H04W 74/002; H04W 74/08
See application file for complete search history.

(56) References Cited

U.S. PATENT DOCUMENTS 4,096,440 A      6/1978  Okasaka
2015/0245411 A1* 8/2015  Damnjanovic ....... H04W 74/08
                                                          370/328
(Continued)

FOREIGN PATENT DOCUMENTS

CN    101047995 A    10/2007
CN    101720099 A    6/2010
(Continued)

OTHER PUBLICATIONS

International Search Report and Written Opinion for International Appl. No. PCT/CN2017/097416, dated Oct. 19, 2017.
(Continued)

*Primary Examiner* — Jael M Ulysse
(74) *Attorney, Agent, or Firm* — Foley & Lardner LLP

(57) ABSTRACT

A signal transmission method includes: performing (101) a clear channel assessment (CCA) detection on a predetermined spectrum to obtain a CCA detection result; exchanging (102) information with a counterpart device; and performing data transmission according to at least one of the detection result and the exchanged information.

20 Claims, 5 Drawing Sheets

(51) Int. Cl.
*H04W 74/00* (2009.01)
*H04W 72/20* (2023.01)
*H04W 72/23* (2023.01)
*H04W 76/27* (2018.01)

(52) U.S. Cl.
CPC ......... *H04W 74/002* (2013.01); *H04W 74/08* (2013.01); *H04W 76/11* (2018.02); *H04W 76/27* (2018.02)

(56) References Cited

U.S. PATENT DOCUMENTS

| | | | | |
|---|---|---|---|---|
| 2015/0289208 A1* | 10/2015 | Liu | ....................... | H04L 1/1887 370/252 |
| 2015/0327233 A1* | 11/2015 | Liu | ....................... | H04L 5/0098 370/329 |
| 2015/0334744 A1* | 11/2015 | Ji | ........................ | H04L 5/0007 370/336 |
| 2015/0349931 A1* | 12/2015 | Damnjanovic | ... | H04W 72/0446 370/280 |
| 2015/0373652 A1* | 12/2015 | Dabeer | ............... | H04W 52/262 455/522 |
| 2016/0043854 A1* | 2/2016 | Damnjanovic | ....... | H04L 1/1867 370/329 |
| 2016/0192395 A1* | 6/2016 | Yoo | ....................... | H04W 74/08 370/329 |
| 2016/0227578 A1* | 8/2016 | Lee | ..................... | H04W 74/004 |
| 2016/0242213 A1* | 8/2016 | Dabeer | ............. | H04W 74/0833 |
| 2016/0286545 A1* | 9/2016 | Luo | ....................... | H04L 1/1812 |
| 2016/0286603 A1* | 9/2016 | Vajapeyam | ....... | H04W 72/0453 |
| 2016/0302225 A1* | 10/2016 | Damnjanovic | ....... | H04W 74/02 |
| 2016/0323915 A1* | 11/2016 | Liu | .................... | H04W 74/0825 |
| 2016/0338096 A1* | 11/2016 | Vajapeyam | ....... | H04W 72/1268 |
| 2016/0345206 A1* | 11/2016 | Yerramalli | .............. | H04L 5/001 |
| 2016/0366689 A1* | 12/2016 | Zhang | .................... | H04L 5/0091 |
| 2017/0013482 A1* | 1/2017 | Tandai | ................. | H04L 5/0048 |
| 2017/0048880 A1* | 2/2017 | Anderson | .......... | H04W 72/1268 |
| 2017/0230986 A1* | 8/2017 | Moon | ................... | H04W 74/08 |
| 2017/0303136 A1* | 10/2017 | Park | ................... | H04W 74/0808 |
| 2017/0339719 A1* | 11/2017 | Xu | ........................ | H04W 74/08 |
| 2017/0339721 A1* | 11/2017 | Mukherjee | .......... | H04W 72/566 |
| 2018/0091242 A1* | 3/2018 | Li | ........................ | H04B 17/318 |
| 2018/0139701 A1* | 5/2018 | Wang | ................. | H04W 52/146 |
| 2018/0324857 A1* | 11/2018 | Zhang | .................. | H04W 72/04 |
| 2019/0014591 A1* | 1/2019 | Lei | .................... | H04W 72/1273 |
| 2019/0159253 A1* | 5/2019 | Koorapaty | ........... | H04W 74/006 |
| 2019/0191456 A1* | 6/2019 | Koorapaty | ......... | H04W 74/0808 |

FOREIGN PATENT DOCUMENTS

| | | |
|---|---|---|
| CN | 105049136 A | 11/2015 |
| CN | 105072690 A | 11/2015 |
| CN | 105578610 A | 5/2016 |
| CN | 105722097 A | 6/2016 |

OTHER PUBLICATIONS

First Office Action for CN Appl. No. 2016106644016, dated Oct. 9, 2022.
First Search Report for CN Appl. No. 2016106644016, dated Sep. 27, 2022.

* cited by examiner

SIGNAL TRANSMISSION METHOD, COMMUNICATION DEVICE AND COMMUNICATION SYSTEM FOR ALLEVIATING HIDDEN NODES

CROSS REFERENCE TO RELATED APPLICATIONS

This is a U.S. National Stage Application, under 35 U.S.C. 371, of International Patent Application No. PCT/CN2017/097416, filed on Aug. 14, 2017, which claims priority to Chinese patent application No. 201610664401.6 filed on Aug. 12, 2016, contents of both of which are incorporated herein by reference in their entireties.

TECHNICAL FIELD

The present disclosure relates to the field of wireless communications and, in particular, to a signal transmission method, communication device and communication system.

BACKGROUND

The rapid development of mobile Internet and Internet of Things leads to the explosive growth of data traffic, and the extensive rise of differentiated and diversified traffic. Compared with 4th generation (4G) mobile communication technology, the 5th generation (5G) mobile communication technology, as a new generation mobile communication technology, supports a higher rate, massive links (such as one million links per square kilometer), ultra-low latency (such as 1 ms), higher reliability, and hundredfold energy efficiency improvement to support the new requirement. The goal of the 5G study item (SI) is to determine and meet the design requirements of key technologies of the new radio (NR) system in any spectrum bandwidth range (at least 100 GHz) and support the NR to work on the licensed and unlicensed spectrum. At present, researches on standards of 5G NR applied on the unlicensed spectrum are gradually being pushed forward.

SUMMARY

The following is a summary of the subject matter described herein in detail. This summary is not intended to limit the scope of the claims.

Embodiments of the present disclosure are expected to provide a signal transmission method, a communication device and a communication system, which can alleviate the hidden node problem in the high frequency scenario to a certain extent, and improve transmission efficiency and system performance.

An embodiment of the present disclosure provides a signal transmission method. The method includes:
performing a clear channel assessment (CCA) detection on a predetermined spectrum to obtain a CCA detection result;
exchanging information with a counterpart device; and
performing data transmission according to at least one of the detection result and the exchanged information.

Optionally, the exchanging information with the counterpart device includes at least one of the following:
sending an indication signal to the counterpart device, where the indication signal carries information about whether a channel is detected by a home device to be idle; and receiving an indication signal sent by the counterpart device where the indication signal carries information about whether the channel is detected to be idle by the counterpart device.

Optionally, sending the indication signal to the counterpart device carrying information about whether the channel is detected to be idle by the home device includes: in response to detecting the channel is idle, sending the indication signal to the counterpart device;
the receiving the indication signal sent by the counterpart device carrying information about whether the channel is detected by counterpart device to be idle includes: receiving the indication signal sent by the counterpart device when the counterpart device detects the channel idleness.

Optionally, the in response to detecting that the channel is idle, sending the indication signal to the counterpart device includes: in response to detecting that the channel is idle, sending, by a sending device, the indication signal by radio resource control (RRC) signaling or physical layer signaling or a predetermined time frequency resource.

Optionally, the exchanging information with the counterpart device includes:
exchanging with the counterpart device a feedback signal indicating whether the indication signal is received.

Optionally, the exchanging with the counterpart device the feedback signal indicating whether the indication signal is received includes: after the indication signal sent by the counterpart device is received, sending the feedback signal to the counterpart device.

Optionally, a predetermined time interval is between receiving the indication signal and sending the feedback signal Optionally, the predetermined time interval is 1 us, 2 us, 4 us, 9 us, 16 us or a time period for sensing the channel.

Optionally, the predetermined time interval is determined in one of the following manners: predefined, or predetermined by a base station and a user equipment (UE), or indicated by physical layer downlink control information (DCI) signaling, or indicated by higher layer radio resource control (RRC) signaling.

Optionally, the method further includes at least one of: when detecting that channel is idle, sending, by a sending device, a first indication signal during data transmission; and receiving a second indication signal sent by the counterpart device.

Optionally, the when detecting that the channel is idle, sending, by the sending device, the first indication signal during data transmission includes at least one of: during the data transmission, sending, by the sending device, the first indication signal periodically; during the data transmission, receiving the second indication signal sent by the counterpart device periodically; during the data transmission, sending, by the sending device, the first indication signal for a specific number of times; and during the data transmission, receiving the second indication signal sent by the counterpart device for a specific number of times.

Optionally, sending the first indication signal or receiving the second indication signal or the period or the specific number of times is through a position appointed by the base station and the user equipment; a position notified by physical layer DCI; a position configured by higher layer RRC signaling; a predefined position; and an appointment between the sending device and the receiving device.

Optionally, each time the indication signal is sent in a beam direction directed to the receiving device, or is sent in a direction different from the beam direction directed to the receiving device.

Optionally, at least one of the indication signal, the feedback signal, the first indication signal, and the second indication signal is in a signal format of N fields, where N is a positive integer.

Optionally, each of the N fields includes M basic units, where M is a positive integer.

Optionally, information carried by the indication signal, the feedback signal, the first indication signal, or the second indication signal includes at least one of:
- an information head for indicating at least one of a cell identifier, a base station identifier, a terminal identifier, an operator identifier, a physical layer identifier, and a media access control (MAC) layer identifier;
- a transmission duration for indicating a duration in which a specific spectrum is occupied for transmission;
- the operator identifier for indicating an operator providing a communication service;
- a device identifier for identifying a device of the sending party and a device of the receiving party;
- a sector identifier for identifying a sector providing the communication service;
- a training sequence identifier for identifying a training sequence;
- a beam direction including at least one of a beam sending direction and a beam arriving direction and for indicating a beam transmission direction;
- verification information for verifying information transmitted by the specific spectrum;
- a channel state identifier for indicating that a channel is idle or busy;
- a sending power for indicating a signal power for sending data;
- a multiplexing indication for indicating whether the channel can be multiplexed;
- frequency domain information including at least one of a frequency domain length, a frequency domain start point, a frequency domain end point, and a frequency domain interval; and
- a reservation indication identifier for indicating predetermined information.

Optionally, a communication device with which a multiplexing is available determines whether to implement at least one of time domain multiplexing, frequency domain multiplexing, and spatial domain multiplexing by identifying information carried in the indication signal.

Optionally, at least one of predetermined sending parameters is different in each sending of the indication signal; or all predetermined sending parameters are the same for each sending of the indication signal; and
the predetermined transmitting parameters include at least one of a beam direction, a sending sequence and a sending power.

Optionally, the method further includes:
receiving an indication signal sent by another device for selecting or occupying a first channel.
the performing, by the communication device, data transmission according to at least one of the detection result and the exchanged information includes:
performing spatial multiplexing on the first channel according to the detection result, the indication signal and the indication signal sent by another device.

Optionally,
the receiving the indication signal sent by another device for selecting or occupying the first channel includes:
receiving an indication signal sent by another communication device of a different system, where the indication signal is sent by using at least one of a reference signal, an identification signal and a pattern signal.

Optionally, the method further includes:
before performing the CCA detection on the predetermined spectrum, determining a CCA detection parameter according to a subcarrier interval of the predetermined spectrum.

Optionally, the before performing the CCA detection on the predetermined spectrum, determining the CCA detection parameter according to the subcarrier interval of the predetermined spectrum includes: determining a parameter and a parameter duration related to the CCA according to the subcarrier interval of the predetermined spectrum.

Optionally, the determining the parameter and the parameter duration related to the CCA according to the subcarrier interval of the predetermined spectrum includes:
determining, according to the subcarrier interval of the predetermined spectrum, at least one of a duration of a defer period, a detection duration within the defer period, a random backoff value, a size of a minimum contention window, a size of a maximum contention window, a duration or a size between the minimum contention window and the maximum contention window, a slot duration.

Optionally, the method further includes: before performing the CCA detection on the predetermined spectrum, determining, by using a preset functional relationship, at least one of a transmission scenario, a transmission signal, an energy detection threshold of a transmission channel.

Optionally, the determining, by using the preset functional relationship, at least one of the transmission scenario, the transmission signal, the energy detection threshold of the transmission channel includes: determining, according to an existing energy detection threshold calculation formula and by introducing at least one of a new offset and parameter, at least one of the transmission scenario, the transmission signal, the energy detection threshold of the transmission channel.

An embodiment of the present disclosure further provides a signal processing method, including:
before performing data transmission by using a predetermined spectrum, negotiating with a peripheral device; and
performing, according to the negotiation result, the data transmission on the predetermined spectrum.

Optionally, the before performing data transmission by using the predetermined spectrum, negotiating with the peripheral device includes: before performing data transmission by using the predetermined spectrum, negotiating with the peripheral device at least one of a time domain resource, a frequency domain resource, a spatial domain resource, and a transmission power of an unlicensed spectrum.

An embodiment of the present disclosure further provides a transmission control method, including:
acquiring, by a transmission node or a transmission pair, a transmission opportunity on a preset spectrum; and
after acquiring a right to use the preset spectrum, performing, by the transmission node or the transmission pair, transmission on the acquired transmission opportunity.

Optionally, the acquiring, by the transmission node or the transmission pair, the transmission opportunity on the preset spectrum, including allocating the transmission opportunity on the preset spectrum for the transmission node or the transmission pair by a central control node, or a network, or physical layer DCI signaling, or higher layer RRC signaling; or determining the transmission opportunity on the preset spectrum allocated to the transmission node or the transmission pair by negotiation between transmission nodes.

Optionally, the transmission opportunities on the preset spectrum of different transmission nodes or transmission pairs are in a time division multiplexing mode and/or a frequency division multiplexing mode and/or a space division multiplexing mode.

Optionally, when a first transmission node or a first transmission pair performs transmission on the transmission opportunity, a second transmission node or a second transmission pair is woken up and performs at least one of an interference report generation or a CCA detection on the transmission opportunity of the first transmission node or the first transmission pair.

when the second transmission node or the second transmission pair performs transmission on the transmission opportunity, the first transmission node or the first transmission pair is woken up and performs at least one of an interference report generation or a CCA detection on the transmission opportunity of the second transmission node or the second transmission pair.

Optionally, reporting, by the transmission node or the transmission pair that is waken up for performing the CCA detection, the interference report to the network or the central control node.

Optionally, determining, according to whether the interference reported by the transmission node or the transmission pair which is woken up for performing the CCA detection satisfies a certain threshold value, whether interference exists between transmission pairs or in at least one of the first transmission node and the second transmission node.

Optionally, in response to determining that the interference reported by the transmission node or the transmission pair that is woken up for performing the CCA detection satisfies a certain threshold value, it is determined that the interference exists in at least one of the first transmission node and the second transmission node, or between the transmission pairs.

Optionally, adjusting, by the network or the central control node receiving the interference report, the transmission opportunity of at least one of the first transmission node and the second transmission node, or between the transmission pairs.

Optionally, in response to determining that the interference reported by the transmission node or the transmission pair that is woken up for performing the CCA detection does not satisfy a certain threshold value, it is determined that the interference does not exist in at least one of the first transmission node and the second transmission node, or between the transmission pairs.

Optionally, in a next transmission, the transmission pair or at least one of the first transmission node and the second transmission node performs data transmission on the same transmission opportunity in a space division multiplexing manner.

Optionally, performing, by the transmission pair or at least one of the first transmission node and the second transmission node, at least one of generating an interference measurement report and reporting the interference measurement report to the network or the central control node during the data transmission process in the space division multiplexing manner, where the interference measurement report is used for adjusting the transmission opportunity.

Optionally, the interference reporting includes at least one of:

reporting the interference periodically, reporting the interference based on an event, reporting the interference based on signaling triggering or implicit triggering.

Optionally, at least one of a time domain position, a frequency domain position and a period of the interference report is determined by at least one of:

an appointment of a base station and a UE, physical layer DCI signaling notification, and higher layer RRC signaling notification, or predefinition.

Optionally, the method further includes:

after acquiring the right to use the preset spectrum, reserving a specific time domain duration in the time domain.

Optionally, the design of reserving the specific time domain duration needs to meet at least one of the following features:

feature one: the time domain duration is not greater than a detection duration or sensing time of a node with which the multiplexing is unavailable.

feature two: the time domain duration meets that a node with which the multiplexing is available can detect that the channel is idle.

Optionally, the transmission opportunity acquired by the transmission node or the transmission pair includes:

scheduling or indicating multiple consecutive transmission opportunities by one grant; or scheduling or indicating multiple non-consecutive transmission opportunities by one grant; or scheduling or indicating multiple consecutive transmission opportunities by transmitting multiple grants, wherein each grant is used for scheduling or indicating one transmission opportunity; or scheduling or indicating multiple non-consecutive transmission opportunities by transmitting multiple grants, where each grant is used for scheduling or indicating one transmission opportunity.

Optionally, a listen before talk (LBT) type used by the transmission node or the transmission pair for performing a CCA detection before the transmission opportunity includes:

indicating the LBT type in a manner of two grants.

Optionally, the indicating the LBT type in the manner of two grants includes:

indicating the LBT type in a first grant, and indicating the LBT type in a second grant; or indicating the LBT type in the first grant, and triggering, by the second grant, the LBT type indicated in the first grant to take effect; or indicating scheduling information and the LBT type in the first grant, and triggering actual transmission in the second grant; or indicating the scheduling information and the LBT type in the first grant, and triggering, by the second grant, at least one of the actual transmission and taking effect of the LBT type indicated in the first grant; or indicating the scheduling information and the LBT type in the first grant, and triggering the actual transmission and indicating the LBT type in the second grant; or indicating the scheduling information and the LBT type in the first grant, and triggering the actual transmission and indicating or triggering whether to perform the LBT in the second grant; or indicating the scheduling information and the LBT type in the first grant, and the second grant being used for at least one of triggering the actual transmission, triggering whether to perform the LBT, indicating the LBT type; or indicating the scheduling information and not indicating the LBT type in the first grant, and triggering the actual transmission and indicating the LBT type in the second grant.

Optionally, when the two grants both indicate the LBT type, in the actual transmission, the contention based channel access is performed according to the LBT type indicated in the second grant; or when one of the two grants indicates the LBT type, in the actual transmission, the contention based channel access is performed according to the LBT type indicated in one of the two grants; or when one of the two grants performs at least one of indicating the LBT type, triggering the LBT type to take effect, and indicating whether to perform the LBT, in the actual transmission, the contention based channel access is performed according to the LBT type indicated in one of the two grants or the effective LBT type.

Optionally, the scheduling information carried in the first grant includes at least one of:

a redundancy version (RV), a hybrid automatic repeat request (HARM) process identifier (ID), a start point symbol index or position of the transmission, an ending point symbol index or position of the transmission, a blank symbol gap, a number of symbols actually transmitted in one transmission time interval (TTI), a modulation and coding scheme (MCS), a resource block (RB) resource allocation, and a timing relationship value.

information carried in the second grant includes at least one of:

information for triggering the actual transmission, a timing relationship value and at least one of information not notified in the first grant.

An embodiment of the present disclosure further provides a communication device. The communication device includes: a detection unit and a communication unit.

The detection unit is configured to perform a CCA detection on a predetermined spectrum to obtain a CCA detection result.

The communication unit is configured to exchange information with a counterpart device, and perform data transmission according to at least one of the detection result and the exchanged information.

An embodiment of the present disclosure further provides a communication device. The communication device includes: a negotiation unit and a transmission unit.

The negotiation unit is configured to negotiate with a peripheral device before performing data transmission by using a predetermined spectrum.

The transmission unit is configured to perform the data transmission on the predetermined spectrum according to the negotiation result.

An embodiment of the present disclosure further provides a communication system, which includes: a transmission node or a transmission pair.

The transmission node or the transmission pair is configured to acquire a transmission opportunity on a preset spectrum; and perform transmission on the acquired transmission opportunity after acquiring a right to use the preset spectrum.

An embodiment of the present disclosure provides a signal transmission method. The method includes:

before performing transmission on a specific spectrum, sending one or more indication signals to at least one of a target device or a peripheral device.

Optionally, the specific spectrum includes at least one of: a licensed spectrum, a shared spectrum, a partially shared spectrum and an unlicensed spectrum.

Optionally, the method further includes:

before at least one of performing transmission and sending the indication signal, performing a LBT or a CCA detection mechanism on the unlicensed spectrum.

Optionally, at least one of a time domain position, a frequency domain position, a time-frequency domain position and a spatial domain resource position where the indication signal is sent is determined by the following manners:

an appointment of a base station and a UE;

a physical layer DCI signaling notification;

higher layer RRC signaling configuration; and predefinition.

An embodiment of the present disclosure provides a signal transmission method, including:

before performing transmission on a specific spectrum, receiving one or more indication signals transmitted by at least one of a target device or a peripheral device.

Optionally, the method further includes:

evaluating, based on the received indication signal, a current channel state or a busy/idle state of a channel.

Optionally, the method further includes:

in determining that the channel state is idle or available, performing transmission;

in determining that the channel state is busy or unavailable, stopping the transmission; and in determining that the channel state is busy or unavailable, adjusting a direction, a range or a power of a transmission beam.

Optionally, the specific spectrum includes at least one of: a licensed spectrum, a shared spectrum, a partially shared spectrum and an unlicensed spectrum.

Optionally, the method further includes:

before receiving the indication signal sent by at least one of the target device or the peripheral device, performing the LBT or the CCA detection mechanism on the unlicensed spectrum.

Optionally, the method further includes:

in response to detecting that a channel state is busy or unavailable, sending a message to a sending device; and in response to detecting that the channel state is idle or available, sending or not sending a message to the sending device.

Optionally, the method further includes:

after the indication signal sent by at least one of a sending device and/or the peripheral device is received, sending an indication signal to the sending device.

Optionally, at least one of a time domain position, a frequency domain position, a time-frequency domain position and a spatial domain resource position where the indication signal is sent is determined by the following manners:
- an appointment of a base station and a UE;
- a physical layer DCI signaling notification;
- higher layer RRC signaling configuration; and
- predefinition.

An embodiment of the present disclosure provides a signal transmission device, including:
- a generation module, which is configured to generate an indication signal;
- a transmission module, which is configured to before transmitting on a specific spectrum, send one or multiple indication signals to at least one of a target device or a peripheral device;

Optionally, the specific spectrum includes at least one of: a licensed spectrum, a shared spectrum, a partially shared spectrum and an unlicensed spectrum.

An embodiment of the present disclosure provides a signal transmission device. The signal transmission device includes: a reception module.

The reception module is configured to, before performing transmission on a specific spectrum, receive one or more indication signals sent by at least one of a target device or a peripheral device.

Optionally, the specific spectrum includes at least one of: a licensed spectrum, a shared spectrum, a partially shared spectrum and an unlicensed spectrum.

Embodiments of the present disclosure provides a signal transmission method, a communication device and a communication system, which can alleviate the problem of hidden nodes in a high frequency scenario to some extent, and improve the transmission efficiency and the system performance.

Other aspects can be understood after the accompanying drawings and detailed description are read and understood.

DETAILED DESCRIPTION

The present disclosure will be further described in detail with reference to the accompanying drawings and embodiments.

For a case where the NR is applied to an unlicensed spectrum, a NR system still needs to meet regulatory requirements of the unlicensed spectrum. For example, before performing transmission on the unlicensed spectrum, a listen before talk (LBT) needs to be performed first. In addition, an operating frequency band of the NR includes 5 GHz and 60 GHz. In light of this, the NR works on different frequency bands of the unlicensed spectrum, and thus encounters different problems. The standard LBT process may be used for a frequency band below 6 GHz. For a frequency band above 6 GHz, such as 28 GHz, 45 GHz and 60 GHz, etc., a carrier with the frequency of 60 GHz has poor penetration and serious signal attenuation in the air, which severely limits the transmission distance and signal coverage, so the effective links are limited to a small range. On this basis, a beamforming technology is introduced to the high frequency scenario. With the beamforming technology, the signal sent by the transmitter is transmitted only in a restricted beam range. This feature will cause that the peripheral transmission nodes to mistakenly believe that the channel is idle during the LBT, and actually the channel is occupied by another node. Therefore, in the high frequency scenario, the problem of hidden node is further aggravated. In addition, since the signal transmission is within a certain beam range, the method of determining whether the channel is idle or whether the unlicensed carrier is available by using the LBT mechanism may be not applicable, a new method for accessing the unlicensed carrier needs to be proposed. In the case where the LBT process is still adopted for the channel access in the high frequency scenario, since a new parameter set such as a subcarrier interval and a symbol length is introduced, the LBT process and LBT parameters also need to be modified accordingly to meet the fairness and coexistence of different traffic in the NR and other systems. Furthermore, in the case where the bandwidth is 20 MHz, a CCA detection threshold value for determining whether the channel is idle apparently is not applicable in a large bandwidth scenario.

The method provided by the embodiment of the present disclosure is not limited to the unlicensed spectrum used in the high frequency scenario of the NR, and may also be used for a shared spectrum. Three typical scenarios in the NR include: enhanced mobile broadband (eMBB) and massive machine type communication (mMTC), such as narrow band Internet of Things (NB-IOT) and ultra-reliable low-latency communications (URLLC), such as short transmission time interval (short TTI).

Figure 1:
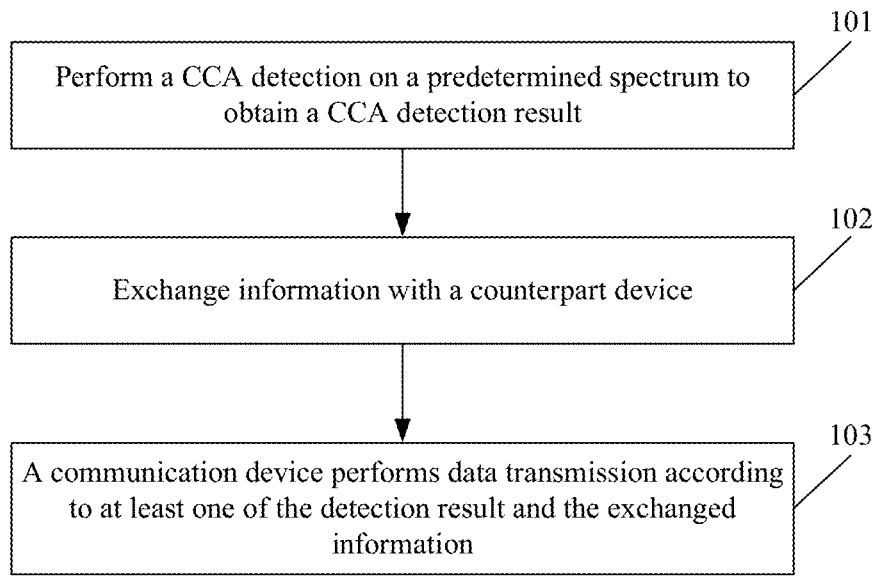
FIG. 1 is a flowchart of a signal transmission method according to an embodiment of the present disclosure.

FIG. 1 is a flowchart of a signal transmission method according to an embodiment of the present disclosure. As shown in FIG. 1, the signal transmission method includes the steps described below.

In step 101, a clear channel assessment (CCA) detection is performed on a predetermined spectrum, and a CCA detection result is obtained.

In step 102, information is exchanged with a counterpart device.

In step 103, according to at least one of the detection result and the exchanged information, the communication device performs data transmission.

In the embodiment of the present disclosure, the process of exchanging information with the counterpart device includes at least one of the following:
  sending an indication signal to the counterpart device, where the indication signal carries information about whether a channel is detected by a home device to be idle; and
  receiving an indication signal sent by the counterpart device, where the indication signal carries information about whether the channel is detected by the counterpart device to be idle.

In the embodiment of the present disclosure, the process of sending the indication signal carrying information about whether the channel is detected by the home device to be idle to the counterpart device includes:
  in response to detecting that the channel is idle, sending the indication signal to the counterpart device.

The process of receiving the indication signal sent by the counterpart device and carrying information about whether the channel is detected by the counterpart device to be idle includes:
  receiving the indication signal sent by the counterpart device when the counterpart device detects that the channel is idle.

In the embodiment of the present disclosure, the process of sending the indication signal to the counterpart device in response to detecting that the channel is idle includes: in response to detecting that the channel is idle, sending, by a sending device, the indication signal by radio resource control (RRC) signaling or physical layer signaling or a predetermined time frequency resource.

In the embodiment of the present disclosure, the step of exchanging information interaction with the counterpart device includes: exchanging with the counterpart device the feedback signal indicating whether the indication signal is received.

In the embodiment of the present disclosure, the exchanging with the counterpart device the feedback signal indicating whether the indication signal is received includes: after the indication signal sent by the counterpart device is received, sending the feedback signal to the counterpart device.

In the embodiment of the present disclosure, the time of receiving the indication signal and the time of sending the feedback signal are spaced apart by a predetermined time interval.

In the embodiment of the present disclosure, the predetermined time interval is 1 us, 2 us, 4 us, 9 us, 16 us or a time period for sensing channel.

In the embodiment of the present disclosure, the predetermined time interval may be determined in one of the following manners: predefined, or predetermined by a base station and s user equipment (UE), or indicated by physical layer downlink control information (DCI) signaling, or indicated by higher layer radio resource control (RRC) signaling.

In the embodiment of the present disclosure, the method further includes: when detecting that the channel is idle and performing the data transmission, at least one of a sending device sending a first indication signal; and the sending device receiving a second indication signal sent by the counterpart device.

In the embodiment of the present disclosure, when detecting that the channel is idle and performing the data transmission, the process that the sending device sends the first indication signal includes one or more of:
  during the data transmission, the sending device sends the first indication signal periodically;
  during the data transmission, the sending device receives the second indication signal sent by the counterpart device periodically;
  during the data transmission, the sending device sends the first indication signal for a specific number of times; and
  during the data transmission, the sending device receives the second indication signal from the counterpart device for a specific number of times.

In the embodiment of the present disclosure, the sending the first indication signal or the receiving the second indication signal, or the period, or the specific number of times is through a position appointed by a base station and a user equipment (UE); a position notified by physical layer DCI; a position configured by higher layer RRC signaling; a predefined position; and an appointment of the sending device and the receiving device.

In the embodiment of the present disclosure, each time the indication signal may be in a beam direction directed to the receiving device, or in a beam direction different from the beam direction directed to the receiving device.

In the embodiment of the present disclosure, at least one of the indication signal, the feedback signal, the first indication signal, and the second indication signal is in a signal format of N fields, where N is a positive integer.

In the embodiment of the present disclosure, each of the N fields includes M basic units, where M is a positive integer.

In the embodiment of the present disclosure, information carried by the indication signal, the feedback signal, the first indication signal, or the second indication signal includes at least one of:
  an information head for indicating at least one of a cell identifier, a base station identifier, a terminal identifier, an operator identifier, a physical layer identifier, and a media access control (MAC) layer identifier;
  a transmission duration for indicating a duration in which a specific spectrum is occupied for transmission;
  the operator identifier for indicating an operator providing a communication service;
  a device identifier for identifying the sending device and the receiving device;
  a sector identifier for identifying a sector providing the communication service;
  a training sequence identifier for identifying a training sequence;
  a beam direction including at least one of a beam sending direction and a beam arriving direction and for indicating a beam transmission direction;

verification information for verifying information transmitted by the specific spectrum;
a channel state identifier for indicating that a channel is idle or busy;
a sending power for indicating a signal power for sending data;
a multiplexing indication for indicating whether the channel can be multiplexed;
frequency domain information including at least one of a frequency domain length, a frequency domain start point, a frequency domain end point, and a frequency domain interval; and
a reservation indication identifier for indicating predetermined information.

In the embodiment of the present disclosure, a communication device by which a channel is multiplexed determines whether to implement one or more of time domain multiplexing, frequency domain multiplexing, and spatial domain multiplexing by identifying information carried in the indication signal.

In the embodiment of the present disclosure, at least one of predetermined sending parameters of the indication signal sent each time is different; or all predetermined sending parameters of the indication signal sent each time are the same.

The predetermined sending parameters include at least one of a beam direction, a sending sequence and a sending power.

In the embodiment of the present disclosure, the method further includes:
receiving an indication signal sent by another device for selecting or occupying a first channel.

The performing data transmission according to at least one of the detection result and the exchanged information includes:
performing, according to the detection result, the indication signal and the indication signal sent by another device, spatial multiplexing on the first channel.

In the embodiment of the present disclosure, the receiving the indication signal sent by other devices for selecting or occupying the first channel includes: receiving an indication signal sent by another communication device of a different system, where the indication signal is sent by using at least one of a reference signal, an identification signal and a pattern signal.

In the embodiment of the present disclosure, the method further includes: before performing the CCA detection on the predetermined spectrum, determining a CCA detection parameter according to a subcarrier interval of the predetermined spectrum.

In the embodiment of the present disclosure, the before performing the CCA detection on the predetermined spectrum, determining the CCA detection parameter according to the subcarrier interval of the predetermined spectrum includes: determining the parameter and the parameter duration related to the CCA according to the subcarrier interval of the predetermined spectrum.

In the embodiment of the present disclosure, the determining, according to the subcarrier interval of the predetermined spectrum, the parameter and the parameter duration related to the CCA includes: determining, according to the subcarrier interval of the predetermined spectrum, at least one of a duration of a defer period, a detection duration within the defer period, a random backoff value, a size of a minimum contention window, a size of a maximum contention window, a duration or a size between the minimum contention window and the maximum contention window, a slot duration.

In the embodiment of the present disclosure, before performing the CCA detection on the predetermined spectrum, determining, by using a preset functional relationship, at least one of a transmission scenario, a transmission signal, an energy detection threshold of a transmission channel.

In the embodiment of the present disclosure, the determining, by using the preset functional relationship, one or more of the transmission scenario, the transmission signal, the energy detection threshold of the transmission channel includes: determining, according to an existing energy detection threshold calculation formula and by introducing one or more of a new offset and parameter, one or more of the transmission scenario, the transmission signal, the energy detection threshold of the transmission channel.

Figure 2:
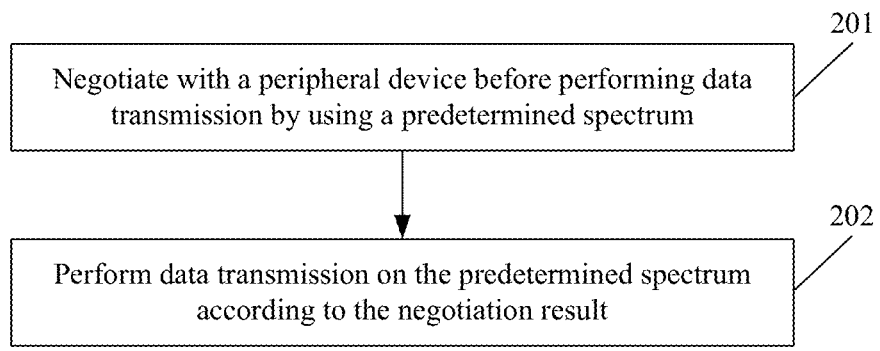
FIG. 2 is a flowchart of a signal processing method according to an embodiment of the present disclosure.

FIG. 2 is a flowchart of a signal processing method according to an embodiment of the present disclosure. As shown in FIG. 2, the signal processing method includes the steps described below.

In step 201, before performing data transmission by using a predetermined spectrum, a negotiation is performed with a peripheral device.

In step 202, according to the negotiation result, the data transmission is performed on the predetermined spectrum.

In the embodiment of the present disclosure, the step of negotiating with the peripheral before performing data transmission using the predetermined spectrum includes: before performing data transmission using the predetermined spectrum, negotiating with the peripheral device at least one of a time domain resource, a frequency domain resource, a spatial domain resource, and a transmission power of an unlicensed spectrum.

Figure 3:
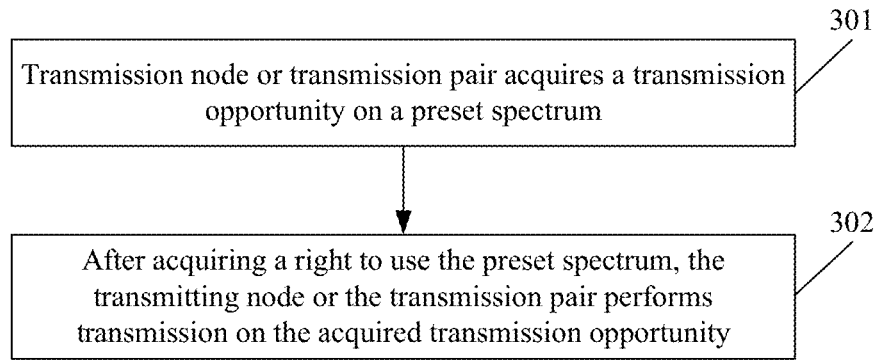
FIG. 3 is a flowchart of a transmission control method according to an embodiment of the present disclosure.

FIG. 3 is a flowchart of a transmission control method according to an embodiment of the present disclosure. As shown in FIG. 3, the transmission control method includes the steps described below.

In step 301, a transmission node or a transmission pair acquires a transmission opportunity on a preset spectrum.

In step 302, after acquiring a right to use the preset spectrum, the transmitting node or the transmission pair performs transmission on the acquired transmission opportunity.

In the embodiment of the present disclosure, the step in which the transmission node or the transmission pair acquires the transmission opportunity on the preset spectrum includes:
allocating the transmission opportunity on the preset spectrum for the transmission node or the transmission pair by a central control node, or a network, or physical layer DCI signaling, or higher layer RRC signaling; or
determining the transmission opportunity on the preset spectrum allocated to the transmission node or the transmission pair by negotiation between transmission nodes.

In the embodiment of the present disclosure, the transmission opportunities of different transmission nodes or transmission pairs on the preset spectrum are in a time division multiplexing mode.

In the embodiment of the present disclosure, when a first transmission node or a first transmission pair performs transmission on the transmission opportunity, a second transmission node or a second transmission pair is woken up to perform at least one of the CCA detection and generating of an interference report on the transmission opportunity of the first transmission node or the first transmission pair.

When the second transmission node or the second transmission pair performs transmission on the transmission opportunity, the first transmission node or the first transmission pair is woken up to perform at least one of the CCA detection and generating of an interference report on the transmission opportunity of the second transmission node or the second transmission pair.

In the embodiment of the present disclosure, the transmission node or the transmission pair that is woken up for performing the CCA detection reports the interference report to the network or the central control node.

In the embodiment of the present disclosure, according to whether the interference reported by the transmission node or the transmission pair that is woken for performing the CCA detection satisfies a certain threshold value, it is determined whether interference exists in at least one of the first transmission node and the second transmission node, or between transmission pairs.

In the embodiment of the present disclosure, in response to determining that the interference reported by the transmission node or the transmission pair that is woken up for performing the CCA detection satisfies a certain threshold value, it is determined that the interference exists in at least one of the first transmission node and the second transmission node, or between the transmission pairs.

In the embodiment of the present disclosure, the network or the central control node adjusts the transmission opportunity between the transmission pairs, or at least one of the first transmission node and the second transmission node.

In the embodiment of the present disclosure, in response to determining that the interference reported by the transmission node or the transmission pair that is woken up for performing the CCA detection does not satisfy a certain threshold value, it is determined that no interference exists in at least one of the first transmission node and the second transmission node, or between the transmission pair.

In the embodiment of the present disclosure, in a next transmission, the transmission pair or at least one of the first transmission node and the second transmission node performs data transmission on the same transmission opportunity in a space division manner.

In the embodiment of the present disclosure, the transmission pair or at least one of the first transmission node and the second transmission node performs at least one of generating an interference measurement report and reporting the interference measurement report to the network or the central control node in the space division multiplexing data transmission, where the interference measurement report is used for adjusting the transmission opportunity.

In the embodiment of the present disclosure, the interference reporting includes at least one of:
reporting the interference periodically, reporting the interference based on an event, reporting the interference based on signaling triggering or implicit triggering.

In the embodiment of the present disclosure, one or more of a time domain position, a frequency domain position and a period of the interference reporting may be determined by at least one of:
an appointment of a base station and a UE, physical layer DCI signaling notification, and higher layer RRC signaling notification or predefinition.

In the embodiment of the present disclosure, after acquiring the right to use the preset spectrum, the transmission node or the transmission pair reserves a specific time domain duration in terms of a time domain.

In the embodiment of the present disclosure, the reserved specific time domain duration needs to meet at least one of the following features:
feature one: the time domain duration is not greater than a detection duration or sensing time of a node with which the multiplexing is unavailable; and
feature two: the time domain duration needs to meet that a node with which the multiplexing is can detect that the channel is idle.

In the embodiment of the present disclosure, the step in which the transmission node or the transmission pair acquires the transmission opportunity includes:
scheduling or indicating multiple consecutive transmission opportunities by one grant; or
scheduling or indicating multiple non-consecutive transmission opportunities by one grant; or
scheduling or indicating multiple consecutive transmission opportunities by transmitting multiple grants, where each grant schedules or indicates one transmission opportunity; or
scheduling or indicating multiple non-consecutive transmission opportunities by transmitting multiple grants, where each grant schedules or indicates one transmission opportunity.

In the embodiment of the present disclosure, a listen before talk (LBT) type used by the transmission node or the transmission pair for performing the CCA detection before the transmission opportunity includes: indicating the LBT type in a manner of two grants.

In the embodiment of the present disclosure, the indicating the LBT type in the manner of two grants includes:
indicating the LBT type in a first grant, and indicating the LBT type in a second grant; or
indicating the LBT type in the first grant, and triggering the LBT type indicated in the first grant to take effect in the second grant; or
indicating scheduling information and the LBT type in the first grant, and triggering actual transmission in the second grant; or
indicating the scheduling information and the LBT type in the first grant, and triggering at least one of the actual transmission and the taking effect of the LBT type indicated in the first grant in the second grant; or
indicating the scheduling information and the LBT type in the first grant, and triggering the actual transmission and indicating the LBT type in the second grant; or
indicating the scheduling information and the LBT type in the first grant, and triggering the actual transmission and indicating or triggering whether to perform a LBT in the second grant; or
indicating the scheduling information and the LBT type in the first grant, and at least one of triggering the actual transmission and triggering whether to perform the LBT and indicating the LBT type in the second grant; or
indicating the scheduling information and not indicating the LBT type in the first grant, and triggering the actual transmission and indicating the LBT type in the second grant.

In the embodiment of the present disclosure, when the two grants both indicate the LBT type, in the actual transmission, the contention based channel access is performed according to the LBT type indicated in the second grant.

Alternatively, when one of the two grants indicates the LBT type, in the actual transmission, the contention based channel access is performed according to the LBT type indicated in one of the two grants.

Alternatively, when one of the two grants performs any one or more of indicating the LBT type, triggering the LBT type to take effect, and whether to perform the LBT, in the actual transmission, the contention based channel access is performed according to the LBT type indicated in one of the two grants or the effective LBT type.

In the embodiment of the present disclosure, the scheduling information carried in the first grant includes at least one of:

a redundancy version (RV), a hybrid automatic repeat request (HARM) process identifier (ID), a start point symbol index or position of transmission, an ending point symbol index or position of the transmission, a blank symbol gap, a numb of symbols of the actual transmission in one transmission time interval (TTI), a modulation and coding scheme (MCS), a resource block (RB) resource allocation, and a timing relationship value.

Information carried in the second grant includes at least one of:

triggering information of the actual transmission, a timing relationship value and at least one piece of information not notified in the first grant.

Figure 4:
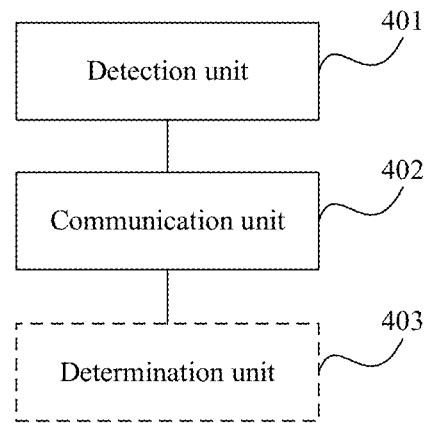
FIG. 4 is a structural diagram of a communication device according to an embodiment of the present disclosure.

FIG. 4 is a structural diagram of a communication device according to an embodiment of the present disclosure. As shown in FIG. 4, the device includes: a detection unit 401 and a communication unit 402.

The detection unit 401 is configured to perform a CCA detection on a predetermined spectrum, and obtain a CCA detection result;

The communication unit 402 is configured to exchange information with a counterpart device, and perform data transmission according to at least one of the detection result and the exchanged information.

In the embodiment of the present disclosure, the communication unit 402 is configured to exchange information with the counterpart device in any one or more of the following manners: sending an indication signal to the counterpart device carrying information about whether a home device detects that a channel is idle; and receiving an indication signal sent by the counterpart device carrying whether a counterpart device detects that the channel is idle.

In the embodiment of the present disclosure, the communication unit 402 is configured to implement one or more: in response to detecting that the channel idle, sending the indication signal to the counterpart device; and receiving the indication signal sent by the counterpart device when the counterpart device detects that the channel is idle.

In the embodiment of the present disclosure, the communication unit 402 is configured to:

in response to detecting that the channel is idle, send, by a sending device, the indication signal by radio resource control (RRC) signaling or physical layer signaling or a predetermined time frequency resource.

In the embodiment of the present disclosure, the communication unit 402 is configured to implement one or more: sending a first indication signal to the counterpart device, where the first indication signal is used for notifying a receiving device or other peripheral nodes of channel occupied duration information; and receiving a second indication signal sent by the counterpart device, where the second indication signal may be used for indicating that the first indication signal has been received or other information.

In the embodiment of the present disclosure, the communication unit 402 is configured to send a feedback signal to the counterpart device after receiving the indication signal sent by the counterpart device.

In the embodiment of the present disclosure, a predetermined time interval is between receiving the indication signal and sending the feedback signal.

In the embodiment of the present disclosure, the predetermined time interval is 1 us, 2 us, 4 us, 9 us, 16 us or a time period sensing channel.

In the embodiment of the present disclosure, the predetermined time interval may be determined in one of the following manners: predefined, or appointed by a base station and a user equipment (UE), or indicated by physical layer downlink control information (DCI) signaling, or indicated by higher layer radio resource control (RRC) signaling.

In the embodiment of the present disclosure, the communication unit 402 is configured to implement one or more: when detecting that the channel is idle, a sending device sending a first indication signal and receiving a second indication signal sent by the counterpart device.

In the embodiment of the present disclosure, the communication unit 402 is configured to implement sending, by the sending device, the first indication signal when detecting that the channel is idle and performing the data transmission in one or more the following manners: during the data transmission, sending, by the sending device, the first indication signal periodically; during the data transmission, receiving the second indication signal sent by the counterpart device periodically; during the data transmission, sending, by the sending device, the first indication signal for a specific number of times; and during the data transmission, receiving the second indication signal sent by the counterpart device for a specific number of times.

In the embodiment of the present disclosure, sending the first indication signal, or receiving the second indication signal, or the period, or the specific number of times is through a position appointed by a base station and a user equipment (UE); a position notified by physical layer DCI;

a position configured by higher layer RRC signaling; a predefined position; and a appointment of the sending device and the receiving device.

In the embodiment of the present disclosure, each time the indication signal is sent in a beam direction directed to the receiving device, or is sent in a beam direction different from the beam direction directed to the receiving device.

In the embodiment of the present disclosure, at least one of the first indication signal and the second indication signal is in a signal format of N fields, where N is a positive integer.

In the embodiment of the present disclosure, each field includes M basic units, where M is a positive integer.

In the embodiment of the present disclosure, information carried in the indication signal includes at least one of:

an information head for indicating at least one of a cell identifier, a base station identifier, a terminal identifier, an operator identifier, a physical layer identifier, and a media access control (MAC) layer identifier;

a transmission duration for indicating a duration in which a specific spectrum is occupied for transmission;

the operator identifier for indicating an operator providing a communication service;

a device identifier for identifying the device of the sending party and the device of the receiving party;

a sector identifier for identifying a sector providing the communication service;

a training sequence identifier for identifying a training sequence;

a beam direction including at least one of a beam sending direction and a beam arriving direction and for indicating a beam transmission n direction;

verification information for verifying information transmitted by the specific spectrum;

a channel state identifier for indicating that a channel is idle or busy;

a sending power for indicating a signal power for sending data;

a multiplexing indication for indicating whether the channel can be multiplexed;

frequency domain information including at least one of a frequency domain length, a frequency domain start point, a frequency domain end point, and a frequency domain interval;

a reservation indication identifier for indicating predetermined information.

In the embodiment of the present disclosure, a communication device available for multiplexing determines whether to implement one or more of time domain multiplexing, frequency domain multiplexing, and spatial domain multiplexing by identifying information carried in the indication signal.

In the embodiment of the present disclosure, at least one of predetermined sending parameters of the indication signal sent each time is different; or all predetermined sending parameters of the indication signal sent each time are the same; and the predetermined sending parameters include at least one of a beam direction, a sending sequence and a sending power.

In the embodiment of the present disclosure, the communication unit 402 is further configured to receive an indication signal sent by another device for selecting or occupying a first channel.

The communication unit 402 is further configured to perform spatial multiplexing on the first channel according to the detection result, the indication signal and the indication signal sent by another device.

In the embodiment of the present disclosure, the communication unit 402 is configured to receive an indication signal sent by another communication device of a different system by using at least one of a reference signal, an identification signal and a pattern signal.

In the embodiment of the present disclosure, the communication device further includes: a determination unit 403.

The determination unit 403 is configured to: before performing the CCA detection on the predetermined spectrum, determine a CCA detection parameter according to a subcarrier interval of the predetermined spectrum.

In the embodiment of the present disclosure, the determination unit 403 is further configured to determine, according to the subcarrier interval of the predetermined spectrum, the parameter and the parameter duration related to the CCA.

In the embodiment of the present disclosure, the determination unit 403 is configured to determine, according to the subcarrier interval of the predetermined spectrum, at least one of a duration of a defer period, a detection duration within the defer period, a random backoff value, a size of a minimum contention window, a size of a maximum contention window, a duration or a size between the minimum contention window and the maximum contention window, a slot duration.

In the embodiment of the present disclosure, a detection unit 401 is further configured to determine, by using a preset functional relationship, one or more of a transmission scenario, a transmission signal, an energy detection threshold of a transmission channel.

In the embodiment of the present disclosure, the detection unit 401 is further configured to determine, according to an existing energy detection threshold calculation formula and by introducing one or more of a new offset and parameter, one or more of the transmission scenario, the transmission signal, the energy detection threshold of the transmission channel.

Figure 5:
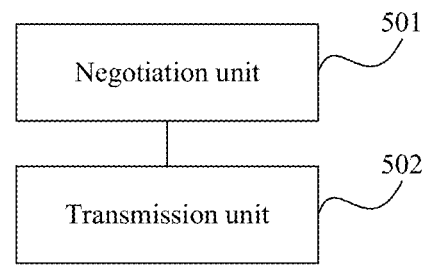
FIG. 5 is a structural diagram of another communication device according to an embodiment of the present disclosure.

FIG. 5 is a structural diagram of another communication device according to an embodiment of the present disclosure. As shown in FIG. 5, the device includes: a negotiation unit 501 and a transmission unit 502.

The negotiation unit 501 is configured to negotiate with a peripheral device before performing data transmission by using a predetermined spectrum.

The transmission unit 502 is configured to perform, according to the negotiation result, the data transmission on the predetermined spectrum.

In the embodiment of the present disclosure, the negotiation unit 501 is configured to before performing data transmission by using the predetermined spectrum, negotiate with the peripheral device at least one of a time domain resource, a frequency domain resource, a spatial domain resource, and a transmission power of an unlicensed spectrum.

Figure 6:
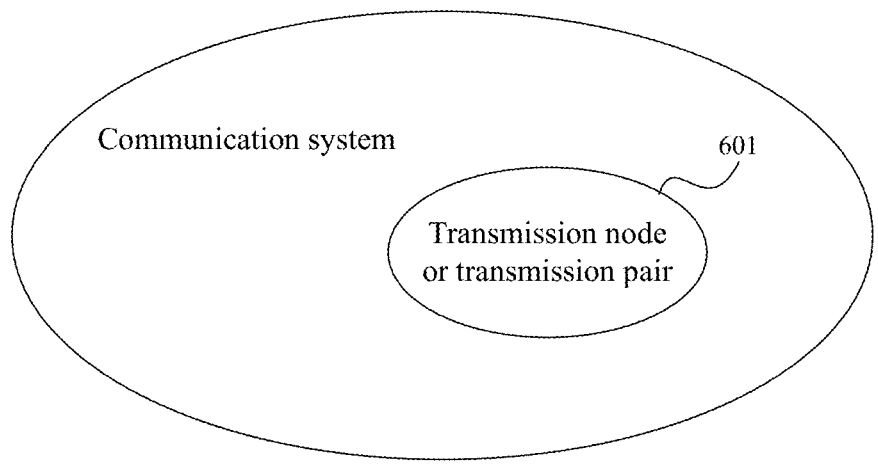
FIG. 6 is a structural diagram of a communication system according to an embodiment of the present disclosure.

FIG. 6 is a structural diagram of a communication system according to an embodiment of the present disclosure. As shown in FIG. 6, the device includes: a transmission node or a transmission pair 601.

The transmission node or the transmission pair 601 is configured to acquire a transmission opportunity on a preset spectrum.

The transmission node or the transmission pair 601 is configured to perform transmission on the acquired transmission opportunity after acquiring a right to use the preset spectrum.

In the embodiment of the present disclosure, the transmission node or the transmission pair 601 is configured to allocate the transmission opportunity on the preset spectrum for the transmission node or the transmission pair by a central control node, or a network, or physical layer DCI signaling, or higher layer RRC signaling.

Alternatively, the transmission opportunity on the preset spectrum allocated to the transmission node or the transmission pair is determined by negotiation between transmission nodes.

In the embodiment of the present disclosure, the transmission opportunities of different transmission nodes or transmission pairs on the preset spectrum are in a time division multiplexing mode.

In the embodiment of the present disclosure, when a first transmission node or a first transmission pair performs transmission on the transmission opportunity, a second transmission node or a second transmission pair is woken up to perform one of more of performing a CCA detection on the transmission opportunity of the first transmission node or the first transmission pair and generating an interference report.

When the second transmission node or the second transmission pair performs transmission on the transmission opportunity, the first transmission node or the first transmission pair is woken up to perform at least one of performing a CCA detection on the transmission opportunity of the second transmission node or the second transmission pair and generating the interference report.

In the embodiment of the present disclosure, the transmission node or the transmission pair that is woken up for performing the CCA detection is configured to report the interference report to the network or the central control node.

In the embodiment of the present disclosure, the transmission node or the transmission pair 601 is further configured to determine, according to whether the interference reported by the transmission node or the transmission pair that is woken up for performing the CCA detection satisfies a certain threshold value, whether interference exists in at least one of the first transmission node and the second transmission node, or between transmission pairs.

In the embodiment of the present disclosure, in response to determining that the interference reported by the transmission node or the transmission pair that is woken up for performing the CCA detection satisfies a certain threshold value, the transmission node or the transmission pair 601 is further configured to determine that the interference exists in at least one of the first transmission node and the second transmission node, or between the transmission pairs.

In the embodiment of the present disclosure, the network or the central control node is configured to adjust the transmission opportunity in at least one of the first transmission node and the second transmission node, or between the transmission pairs.

In the embodiment of the present disclosure, in response to determining that the interference reported by the transmission node or the transmission pair that is woken up for performing the CCA detection does not satisfy a certain threshold value, the transmission node or the transmission pair 601 is further configured to determine that no interference occurs in at least one of the first transmission node and the second transmission node, or between the transmission pairs.

In the embodiment of the present disclosure, in a next transmission, the transmission pair or at least one of the first transmission node and the second transmission node performs data transmission on the same transmission opportunity in a space division manner.

In the embodiment of the present disclosure, the transmission pair or at least one of the first transmission node and the second transmission node performs at least one of generating an interference measurement report and reporting the interference measurement report to the network or the central control node in the data transmission process in the space division manner, where the interference measurement report is used for adjusting the transmission opportunity.

In the embodiment of the present disclosure, the transmission node or the transmission pair 601 is configured to report the interference measurement report periodically, report the interference measurement report based on an event, report the interference measurement report based on signaling or implicit triggering.

In the embodiment of the present disclosure, any one or more of a time domain position of the interference report, a frequency domain position of the interference report, and a period of the interference report may be determined by at least one of:
  an appointment of a base station and a UE, physical layer DCI signaling notification, and higher layer RRC signaling notification or predefinition.

In the embodiment of the present disclosure, the transmission node or the transmission pair 601 is configured to reserve a specific time domain duration after acquiring the right to use the preset spectrum.

In the embodiment of the present disclosure, the reserved specific time domain duration needs to meet at least one of the following features:
  feature one: the time domain duration is not greater than a detection duration or sensing time of a node with which the multiplexing is unavailable.
  feature two: the time domain duration needs to meet that a node with which the multiplexing is available can detect that the channel is idle.

In the embodiment of the present disclosure, the transmission node or the transmission pair 601 is configured to:
  schedule or indicate multiple consecutive transmission opportunities by one grant; or
  schedule or indicate multiple non-consecutive transmission opportunities by one grant; or
  schedule or indicate multiple consecutive transmission opportunities by multiple grants, where one grant is used for scheduling or indicating one transmission opportunity; or
  schedule or indicate multiple non-consecutive transmission opportunities by multiple grants, where one grant is used for scheduling or indicating one transmission opportunity.

In the embodiment of the present disclosure, the transmission node or the transmission pair 601 is configured to indicate the LBT type in a manner of two grants.

In the embodiment of the present disclosure, the indicating the LBT type in the manner of two grants includes:
  indicating the LBT type in a first grant, and indicating the LBT type in a second grant; or
  indicating the LBT type in the first grant, and triggering the LBT type indicated in the first grant to take effect in the second grant; or
  indicating scheduling information and the LBT type in the first grant, and triggering actual transmission in the second grant; or
  indicating the scheduling information and the LBT type in the first grant, and at least one of triggering the actual transmission and triggering the LBT type indicated in the first grant to take effect in the second grant; or
  indicating the scheduling information and the LBT type in the first grant, and triggering the actual transmission and indicating the LBT type in the second grant; or
  indicating the scheduling information and the LBT type in the first grant, and triggering the actual transmission and indicating or triggering whether to perform a LBT in the second grant; or
  indicating the scheduling information and the LBT type in the first grant, and at least one of triggering the actual transmission and triggering whether to perform the LBT and indicating the LBT type in the second grant; or
  indicating the scheduling information and not indicating the LBT type in the first grant, and triggering the actual transmission and indicating the LBT type in the second grant.

In the embodiment of the present disclosure, in response to determining that the two grants both indicate the LBT type, the actual transmission performs contention access of a channel according to the LBT type indicated in the second grant; or
  in response to determining that one of the two grants indicates the LBT type, the actual transmission performs the contention access of the channel according to the LBT type indicated in one of the two grants.

In the embodiment of the present disclosure, the scheduling information carried in the first grant includes at least one of:

a redundancy version (RV), a hybrid automatic repeat request (HARM) process identifier (ID), a start point symbol index or position of transmission, an ending point symbol index or position of the transmission, a blank symbol gap, a number of symbols of the actual transmission in one transmission time interval (TTI), a modulation and coding scheme (MCS), a resource block (RB) resource allocation, and a timing relationship value.

Information carried in the second grant includes at least one of:

triggering information in the actual transmission, a timing relationship value and at least one piece of information not notified in the first grant.

The signal transmission method, the signal processing method and the transmission control method provided by the embodiments of the present disclosure will be described in detail in conjunction with specific implementation scenarios.

An embodiment of the present disclosure provided a signal transmission method, which may be applied to a high frequency scenario, for example, the frequency band is greater than 6 GHz (the typical frequency band is 28 GHz, 45 GHz and 60 GHz), and may also be applied to a low frequency scenario, for example, the frequency band is less than, or less than or equal to 6 GHz (the typical frequency band is 2 GHz, 3.5 GHz, 5 GHz, 700 MHz and 800 MHz). The high frequency scenario or the low frequency scenario may be operated on at least one of a licensed spectrum, an unlicensed spectrum, a partially shared spectrum and a shared spectrum, or on any spectrum available for transmission. For ease of description, at least one of the above spectrums is called as a specific spectrum. In addition, the method is also applicable to the following traffic types, such as enhanced mobile broadband (eMBB) and massive machine type communication (mMTC), such as narrow band Internet of Things (NB-IOT) and ultra-reliable low-latency communications (URLLC), such as short transmission time interval (short TTI).

In addition, in the high frequency scenario, the beamforming technology is an important candidate transmission mechanism, and is beneficial to improve the system performance and enhance the coverage. As is well-known, the transmission beam of the signal on a high frequency channel is very narrow. This narrow beam concentrates the signal energy for a target device. However, it also brings a serious problem of hidden nodes because the narrow beam is difficult to be detected by a peripheral device.

A transmission node or device in the embodiment of the present disclosure may be a base station or a UE. A receiving party refers to a receiver device receiving the signal. A sending party refers to a device of a sender device for sending the signal. The sending party and receiving party refer to the receiving device and the sending device.

Physical layer DCI signaling involved in the embodiment of the present disclosure may be in a DCI format 0, 0A, 0B, 1, 1A, 1B, 1C, 1D, 2, 2A, 2B, 2C, 2D, 3, 3A, 4, 4A and 4B.

In the embodiment of the present disclosure, the indication signal is also called as a first indication signal. An acknowledgement signal is also called as a second indication signal or the indication signal. The signal may also be called as at least one of the first indication signal, the second indication signal, the indication signal, the acknowledgement signal and an occupation signal. The above signal may be a cell-level dedicated signal or a common signal or a UE dedicated signal. The above signal may be sent in an omnidirectional form or a beam form. In response to determining that the signal is sent in the omnidirectional form, the signal may not carry parameters related to the beam direction.

Embodiment One

Based on features of the high frequency, such as poor carrier penetration and serious signal attenuation, a beamforming technology is introduced in a high frequency scenario for controlling a signal propagation direction and a reception direction of a radio-frequency signal, i.e., concentrating the signal energy into one beam direction, which will make the problem of hidden nodes more serious in the high frequency scenario. On this basis, this embodiment provides a contention based channel access method on an unlicensed carrier.

Since the signals sent or received by a transmission node is only transmitted within a certain direction range, transmission nodes around the transmission node and working on the unlicensed spectrum may fail to detect the peripheral signal energy when performing a CCA, and misjudge that the channel is idle and available. However, the channel actually is occupied by another device. Thus, the transmission node which believes that the channel is idle may perform data transmission, causing mutual interference due to the problem of the hidden nodes.

In this embodiment, the transmission node (at least in one of a receiving device and a sending device) performs the following operations before performing transmission on a specific spectrum.

First, the transmission node needs to acquire the right to use the preset spectrum. For a licensed spectrum, a shared spectrum, a partially shared spectrum or an unlicensed spectrum, the allocated spectrum resource may be used as the spectrum, and the contention based channel access method may be not used. Alternatively, the transmission node needs to obtain the right to use resources by a specific contention based access mechanism, such as a LBT mechanism, which is also called as a CCA detection mechanism.

Second, after acquiring the right to use the spectrum (i.e., successfully performing the LBT mechanism or the CCA detection mechanism), the transmitting node sends one or more indication signals (which may be referred to as first indication signals) to at least one of a target device and a peripheral device, or sends the indication signal one or more times to at least one of the target device and the peripheral device. In the case of sending multiple indication signals or in the case of sending the indication signal for multiple times, in each sending, the indication signal sent by the transmission node includes one or more of the following information:

a beam direction, a sequence, a sector, a power, content carried by the signal, verification information, a time domain resource, frequency domain resource information, an occupation time and a modulation and coding scheme (MCS). The transmission node may send the same information for multiple times or send different information in different sendings.

If the target device receives the indication signal from the sending device, the target device may feed an acknowledgment signal back to the sending device, and the acknowledgment signal may also be referred to as an indication signal, or referred to as a second indication signal, or referred to as a response signal. The main function of the acknowledgment signal includes one or more of: indicating the target device has received or acquired information sent by the sending device side such as the channel condition, and indicating information of the own side (for the sending device side, the own side is the receiving side) such as the channel condition.

The signal may carry at least one of the following information: an occupation time (total channel-occupying time for transmission, or remaining transmission time), a sending beam direction, a receiving beam direction, and a channel state identifier (for indicating whether the channel is idle), time domain resource information, frequency domain resource information, a power, an operator identifier, a device identifier, a sector identifier, a training sequence identifier, a multiplexing indication, verification information, the MCS, and interference measurement information.

The signal, or parameters involved in the above signal may be acquired in one of the following manners: a position pre-appointed by a base station and a user equipment (UE); a position notified by physical layer DCI; a position configured by higher layer RRC signaling and a predefined position.

One or more of a time domain position, a frequency domain position, a time-frequency domain position, and a spatial domain resource for sending the indication signal may be determined by: an appointment of the base station and the UE, notification by physical layer DCI signaling; notification by higher layer RRC signaling, and predefinition.

In fact, for the sending device, in response to detecting that the channel is idle, the sending device may perform at least one of: sending the indication signal and receiving the acknowledgment signal sent by the counterpart device. For the receiving device, after receiving the indication signal sent by the sending device or detecting that the channel is idle, the receiving device performs at least one of feeding back the acknowledgment signal and sending the indication signal to the sending device. Upon receiving at least one of: the indication signal sent by the sending device, the acknowledgement signal sent by the sending device, the indication signal sent by the receiving device, or the acknowledgement signal sent by the receiving device, a peripheral device updates and adjusts content information carried in a signal sent by the peripheral device, such as adjusting one or more of a beam direction, a sending power, a transmission duration, a time domain resource, frequency domain resource information, a sector identifier, a training sequence identifier, a multiplexing indication, verification information, and MCS.

In addition, a time interval between receiving the indication signal and feeding back the acknowledgment signal may be acquired in the following manners: a position appointed by the base station and the UE; a position notified by physical layer DCI; a position configured by higher layer RRC signaling, and a predefined position.

In one or more embodiments, the time interval between receiving the indication signal and the feeding back the acknowledgement signal may be 0.5 us, 1 us, 2 us, 4 us, 9 us, 16 us, 25 us. Alternatively, the time interval is determined according to the above values and a certain subcarrier interval ratio change, or is consistent with a feedback time interval specified in Wi-Fi.

In an alternative embodiment, in addition to the CCA detection, the sending party and the receiving party may perform a measurement or an information interaction for determining a relative distance between the sending party and the receiving party, or for exchanging a direction or a direction range of a transmitting beam or a direction or a direction range of a receiving beam with each other, such that the sending party and the receiving party can adjust the beam direction in time, or forbidding some sites from receiving or sending information to avoid interference.

Alternatively, in the embodiment, before performing transmission on the unlicensed carrier, the sending party and the receiving party both perform the CCA detection.

Alternatively, after at least one of the sending party and the receiving party performs the CCA detection, the at least one of the sending party and the receiving party which has performed the CCA detection may be operated in at least one of the manners described below.

In manner one, when the sending party or the receiving party detects that the channel is idle, the sending party or the receiving party which detects that the channel is idle sends an indication signal to the other party, and the device that receives the indication signal does not need to reply an acknowledgement signal.

The indication signal is used for notifying at least one of: the channel is idle, the channel-occupying duration, the beam direction (including at least one of a transmitting direction and a receiving direction), the time domain resource information, the frequency domain resource information, the operator identifier, the device identifier, the sector identifier, the training sequence identifier, the multiplexing indication, the verification information, and MCS.

The acknowledgement signal is used for notifying the counterpart at least one of the following information: the indication signal sent by the counterpart has been received, a signal or information indicating that the channel is idle is received by the counterpart, and a channel detection result of the own side (the channel detection result includes that the channel is idle or the channel is busy).

For example, for the sending party, if the sending device performs the CCA successfully before performing transmission, the sending device sends an indication signal to the receiving party. Otherwise, if the sending device fails to perform the CCA, the sending device does not need to send the indication signal to the receiving device. Similarly, the receiving device performs the same operations as the sending device.

Alternatively, the indication signal may be sent on the unlicensed carrier, or may be sent on a licensed carrier, or may be sent on a shared carrier.

The time domain position for sending the indication signal includes at least one of: sending the indication signal immediately after the LBT is successfully performed, the position appointed by the base station and the UE; the position notified by physical layer DCI; the position configured by the higher layer RRC signaling and a predefined position.

At least one of the time domain position, the frequency domain position, the time-frequency domain position, or the spatial domain resource for sending the indication signal may be determined by the following manners: an appointment of the base station and the UE, notification of the physical layer DCI signaling; configured by the higher layer RRC signaling, and predefinition.

In manner two, after at least one of the sending party or the receiving party detects that the channel is idle, the party detecting that the channel is idle sends the indication signal to the other party, and the other party needs to reply the acknowledgment signal after receiving the indication signal.

The manner two is similar to a RTS/CTS in a Wi-Fi system, i.e., the sending party sends an indication signal to notify transmission nodes around the sending party device of at least one of: the channel is occupied, the occupation time, the transmitting beam direction, the receiving beam direction, the channel state identifier (for indicating whether the channel is idle), the time domain resource information, the frequency domain resource information, the power, the operator identifier, the device identifier, the sector identifier, the training sequence identifier, the multiplexing indication, the verification information, and the MCS; or to cause the transmission nodes around the sending party device to avoid at least one of the aforementioned.

After receiving the indication signal from the sending party, the receiving party replies to the sending party with an acknowledgment signal. The acknowledgment signal is used for indicating at least one of: a channel status of the receiving party, confirmation of receiving the indication signal from the counterparty, and information that transmission is supported, or used for avoiding hidden nodes around the receiving device. Optionally, the acknowledgment signal carries an indication similar to the ACK/NACK. For example, if the receiving party fails to receive the indication signal from the sending party within a certain period of time, the receiving party feeds back the NACK, which is used for instructing the sending party to send the indication signal again, or indicating at least one of a channel status of the receiving party and an interference measurement condition. Otherwise, if the receiving party receives the indication signal from the sending party, the receiving party feeds back the ACK, which is used for indicating that the indication signal from the sending party has been received. Optionally, the acknowledgment signal is also used for indicating that the receiving part performs the CCA to detect whether the channel is idle. In addition, the acknowledgment signal may also carry at least one of: information that the channel is occupied, the occupation time, the sending beam direction, the receiving beam direction, and the channel state identifier (for indicating whether the channel is idle), the time domain resource information, the frequency domain resource information, the power, the operator identifier, the device identifier, the sector identifier, the training sequence identifier, the multiplexing indication, the verification information, and the interference measurement information.

The time interval between the indication signal and the acknowledgment signal may be 0.5 us, 1 us, 1.5 us, 2 us, 3 us, 4 us, 5 us, 6 us, 9 us, 16 us, 25 us or a value acquired according to an arithmetic operation of the above values (the arithmetic operation includes at least one of: addition, subtraction, multiplication, division, and a mixed operations of at least one of the above operations, for example, the time interval is 16 us+3*9=43 us). Alternatively, the time interval is determined according to a certain subcarrier interval ratio change and the above values (for example, the subcarrier interval changes from 15 kHz to 7.5 kHz, the time interval is doubled accordingly, i.e., 4 us, 8us, 18 us or 32 us), or the time interval is consistent with a feedback time interval specified in Wi-Fi.

In manner three, if the detection shows that the channel is busy, no signal is sent.

After at least one of the receiving party and the sending party detects that the channel is idle, the direction of at least one of the sent indication signal and the feedback acknowledgement signal may be the beam direction directed to the target node, or may be a beam direction different from the beam direction directed to the target node.

The above only describes the operations in that the case where at least one of the receiving party and the sending party detects that the channel is idle or busy. In fact, no matter which one of the sending party and the receiving party detects that the channel is idle, the party detecting that the channel is idle needs to perform at least one of the operation (1) and the operation (2). The indication signal is used for indicating that the channel is idle and indicating parameter information related to the signal transmission of the party detecting that the channel is idle (for example, at least one of operator information, cell information, terminal information, beam direction information, power information, MCS information, RV version information, process number information, time domain resource information, frequency domain resource information, etc.). The acknowledgement signal is used for indicating, to the party sending the indication signal, that the party receiving the indication signal has received one or more of the signal indicating that the channel is idle and relevant parameter information, as well as relevant parameter information of the party receiving the indication signal.

Here, when at least one of the receiving party and the sending party detects that the channel is idle, the sent indication signals may be the same indication signal. Alternatively, the indication signals may carry the same information (i.e., the formats of the indication signals may be the same or different, and the contents carried by different fields in the format may be the same or different). Alternatively, the indication signals may be different indication signals, or may carry different information. Similarly, the acknowledgement signals sent by at least one of the receiving party and the sending party may be the same acknowledgement signal, or the acknowledgement signals carry the same information. Alternatively, the acknowledgement signals are different acknowledgement signals or carry different information. In addition, the sent indication signal and the acknowledgement signal may be the same signal or different signals.

At least one of the indication signal and the acknowledgement signal may be determined in the following manners: at least one of the indication signal and the acknowledgement signal is pre-appointed by the sending party and receiving party, or at least one of the indication signal and the acknowledgement signal is predefined, or at least one of the indication signal and the acknowledgement signal is notified by the higher layer RRC signaling, or the terminal is notified of at least one of the indication signal and the acknowledgement signal by base station physical layer signaling. The physical layer signaling may be DCI format 0/0A/0B/1/1A/1B/1C/1D/2/2A/2B/2C/2D/3/3A/4/4A/4B.

Figure 7:
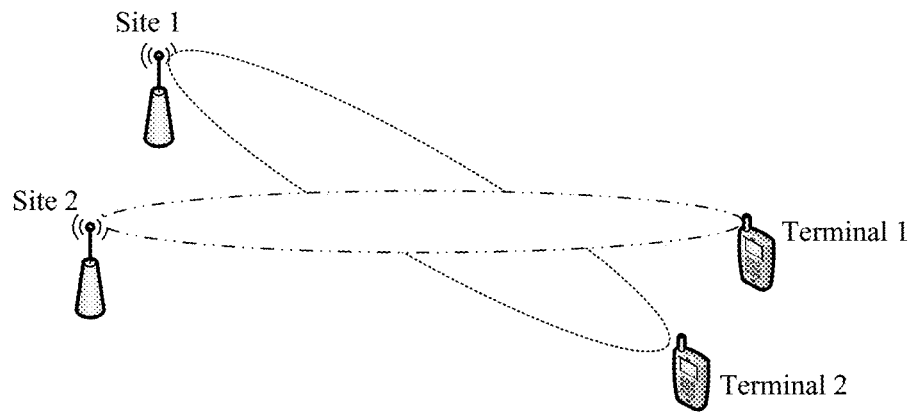
FIG. 7 is a schematic diagram showing a case where a transmission device in a high frequency scenario performs transmission by using a beamforming technology according to an embodiment one of the present disclosure.

FIG. 7 is a schematic diagram of a case where a transmission device performs transmission with a beamforming technology in a high frequency scenario. It is assumed that the site 1 needs to send data to the terminal 2 and the site 2 needs to send data to the terminal 1. According to FIG. 1, before the site 1 and the site 2 perform data transmission on the unlicensed carrier, they need to determine whether the current channel is idle. Only the node determines the channel is idle by performing the CCA detection or LBT mechanism, the node can perform signal transmission or channel transmission or data transmission. In this case, since the beamforming technology is introduced in the high-frequency scenario, the problem of the hidden nodes becomes more serious.

For FIG. 7, the site 1 performs the CCA detection before transmission and fails to detect signal energy in its vicinity, and thus determines that the current channel is idle and available and sends information to the terminal 2. In this case, both the site 1 and the site 2 transmit information by using the narrow beam. Although the site 1 is located in the vicinity of the site 2, the site 2 fails to detect the energy on a peripheral channel in the CCA detection, and determines that the channel is idle and available for sending information to the terminal 1. Furthermore, although the site 1 and the site 2 are adjacent and close to each other, they are not within the range of receiving beam of each other, and thus there is no interference between the site 1 and the site 2.

Figure 8:
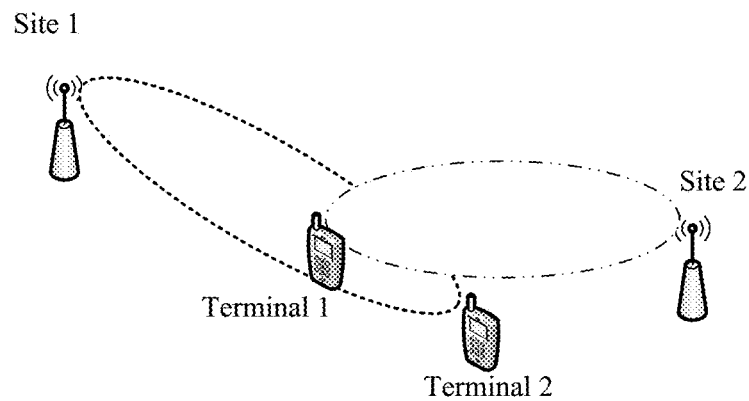
FIG. 8 is a schematic diagram showing another case where a transmission device in a high frequency scenario performs transmission by using a beamforming technology according to the embodiment one of the present disclosure.

FIG. 8 is a schematic diagram of another case where a transmission device performs transmission by using a beamforming technology in a high frequency scenario. It is assumed that the site 1 sends information to the terminal 2 and the site 2 sends the information to the terminal 1. The site 1 is far away from the site 2, and the terminal 1 is adjacent to the terminal 2. The information includes at least one of: data, control, acknowledgment information and indication information. When the site 1 and the site 2 need to transmit information, the site 1 and the site 2 perform the CCA detection to determine whether the channel is idle. In response to determining that the channel is idle, the site 1 sends information to the receiving terminal 2 in the beam range of the site 1, and the site 2 sends information to the receiving terminal 1 within the beam range of the site 2. In this case, since the receiving terminal does not perform the CCA detection, the receiving terminal cannot know whether there is interference around. On this basis, when the terminal 1 receives information sent by the site 1 and the terminal 2 receives information sent by the site 2, serious interference may be caused on the information reception of at least one of the terminal 1 and the terminal 2. For example, in FIG. 8, the terminal 1 is within the beam range of the site 1. Once the site 1 and the site 2 perform information transmission simultaneously, the terminal 1 not only can receive the information of its own site 2, but also can receive information from the site 1, so the information sent by the site 1 causes serious interference on the process that the terminal 1 receives information from site 2. Since the terminal 2 is not within the beam range of the site 2, the terminal 2 receiving information from the site 1 is not interfered by the information sent by the site 2 does not.

For the case of FIG. 8, from the perspective of the perceiver, the sender starts to send information to the receiver when detecting that the channel is idle by performing the CCA detection. In this case, even if the receiver also performs the CCA detection before receiving the information sent by the sender, since the vicinity node does not perform information transmission or reception, the receiver fails to sense the vicinity interference. In this case, when both the sending party and the receiving party consider the channel is idle and start to send and receive data, it is possible to cause serious interference because at least one of the sending and the receiver has close geographical location as well as both the sender and the receiver receive and send the information. In this case, a good processing method is that: in addition to the CCA detection, optionally, the sending party and receiving party may perform a measurement or an information interaction for determining a relative distance between the sending party and receiving party, or for exchanging the direction or the direction range of the transmitting beam or the direction or the direction range of the receiving beam with each other, such that the sending party and receiving party can adjust the beam direction in time, or for forbidding some sites from receiving or sending information to avoid interference.

Here, the site 1 or the site 2 determines that the channel is idle because no other node in the vicinity of the site 1 or the site 2 is sending the information, or the site 1 and the site 2 are not in the transmitting beam ranges of other vicinity nodes.

For ease of description, the sending party sends the first indication signal and the receiving party sends the second indication signal. If the receiving party becomes the sending party, the processing is the same.

During the data transmission, at least one of the sending party and the receiving party performs at least one of signal transmission and signal reception for one or more times. At least one item of multiple transmissions and receptions is at least one of the periodically sending the indication signal and periodically receiving the indication signal, or aperiodically sending indication signal and aperiodically receiving the indication signal. The aperiodic sending of the indication signal may be triggered by physical layer DCI signaling. Before at least one of receiving the signal and sending the signal, the CCA detection may be performed. Alternatively, the signal is directly sent without performing the CCA detection. A condition for the device continuing to send data is: as long as the indication signal is sent, the data transmission may be continued. Alternatively, the indication signal is sent and the acknowledgment signal or the indication signal from the counter party is received, the data transmission can be continued. The condition for continuing to receive data is similar. For example, as long as the indication signal is received, the data reception may be continued. Alternatively, as long as the indication signal is sent, the data reception may be continued. Alternatively, the indication signal sent by the counter party is received, and the indication signal or the acknowledgement signal is fed back, the data reception may be continued. Optionally, the sending part must send the indication signal, and receive the indication signal fed back by the counter party. If the sending device does not perform signal transmission after sending the indication signal, the sending device may lose the channel. In order to avoid this, the time interval between sending the indication signal and feeding back the indication signal is designed to be as short as possible. Optionally, sending the indication signal and feeding back the indication signal may be in different time segments on the same resource.

The specific implementation manner is as follows.

At least one of the sending party and receiving party has begun to perform transmission. During the transmission, the sending device stops sending data and sends the first indication signal, and the receiving device, in addition to receive the data, sends the second indication signal in a time interval starting from the time of receiving the first indication signal sent by the sending device.

Alternatively, during data transmission, the sending device stops sending the data but sends the first indication signal on a specific resource 1 (including at least one of the time domain resource, the frequency domain resource, and the spatial domain resource). The receiving device receives, on the specific resource 1 (including at least one of the time domain resource, the frequency domain resource and the spatial domain resource), the first indication signal sent by the sending device.

Similarly, on the receiving device side, for determining whether the hidden node exists, the receiving device may send the first indication signal on a specific resource 2 during the transmission and the sending device receives the first indication signal on the specific resource 2. The specific resource 1 and the specific resource 2 may be the same, or be at least one of different time domain resources, frequency domain resources and spatial domain resourced.

In addition, before sending the first indication signal or the second indication signal on a specific resource, the sending device or the receiving device may perform or not perform the LBT. If the sending device or the receiving device performs the LBT successfully, the transmission or reception of the indication signal (at least one of the first indication signal and the second indication signal) is performed, and the data transmission or reception is performed. Alternatively, if the sending device performs the LBT successfully, the sending device sends the first indication signal, and the receiving device performs the LBT after receiving the indication signal. If the receiving device performs the LBT successfully, the receiving device sends the second indication signal. Alternatively, the receiving device sends the second indication signal without performing the LBT. After the sending device receives the second indication signal sent by the receiving device, the sending device begins to send data. In the case of not performing the LBT, the first indication signal or the second indication signal is sent directly on the specific resource.

At least one of whether to perform the LBT and the LBT type, or the period may be determined in at least one of the following manners: the appointment of the base station and the UE, notification of the physical layer DCI signaling; configuration of the higher layer RRC signaling, predefinition, and a combination of the above manners.

The time interval may be determined by at least one of: the appointment of the base station and the UE, notification of the physical layer DCI signaling; configuration of the higher layer RRC signaling, predefinition, and a combination of the above manners. Optionally, the time interval may be 0.5 us, 1 us, 1.5 us, 2 us, 3 us, 4 us, 5 us, 6 us, 9 us, 16 us, 25 us or a value acquired according to an arithmetic operation of the above values (the arithmetic operation includes at least one of: addition, subtraction, multiplication, division, and a mixed operation of the above operations, for example, the time interval is 16 us+3*9, and equals to 43 us). Alternatively, the time interval is determined according to a certain subcarrier interval ratio change and the above values (for example, the subcarrier interval changes from 15 kHz to 7.5 kHz, the time interval is doubled accordingly, i.e., 4 us, Bus, 18 us or 32 us), or the time interval is consistent with a feedback time interval specified in Wi-Fi.

The first indication signal or the second indication signal may be sent to the target device a peripheral device. The transmitting direction of the first indication signal or the second indication signal may be the direction directed to the target device, or may be different from the direction directed to the target device. Similarly, when the receiving device is switched from signal reception to signal transmission, at least one of the manner of sending the first indication signal and the manner of receiving the second indication signal may be adopted.

When occupying the channel for transmission, at least one of the receiving device and the transmitting device may send at least one of the first indication signal and the second indication signal for one or more times.

Specifically, the sending position (including at least one of a time domain resource position, a frequency domain resource position and a spatial domain resource position) of at least one of the first indication signal and the second indication signal may be determined by at least one of: the sending position is appointed by the base station and the UE in advance, the sending position is notified through the physical layer DCI signaling; the sending position is configured through the higher layer RRC signaling, the sending position is predefined, and the sending position is determined by a combination of the above manners (for example, determined by the physical layer DCI signaling and the higher layer RRC signaling).

At least one of the first indication signal and the second indication signal may include: the occupying time (total channel occupying time for transmission, or remaining transmission time), the transmitting beam direction, the receiving beam direction, and the channel state identifier (for indicating whether the channel is idle), the time domain resource information, the frequency domain resource information, the power, the operator identifier, the device identifier, the sector identifier, the training sequence identifier, the multiplexing indication, the verification information, the MCS, the LBT type, triggering whether to perform the LBT, and interference measurement information.

In an optional embodiment, information or parameters carried in at least one of the first indication signal and the second indication signal may be determined by one of the following manners: an appointment of the base station and the UE, notification of the physical layer DCI signaling; the configuration of the higher layer RRC signaling, predefinition and a combination of the above manners.

Embodiment Two

For a case where a transmission device has occupied the channel and begins the transmission, the receiver only receives a signal without sending the signal, the vicinity node or device around the receiving party performs the CCA detection before the transmission and detects that the channel is idle, and then performs the transmission or reception. In this case, the transmission of the peripheral device will interfere the information reception of the receiving party. On this basis, this embodiment gives a method for a receiver device to avoid the problem of hidden nodes during the transmission.

One solution is that the receiving device sends an indication signal for one or more times in an interval of receiving at least one of a signal and data from a sending device.

The signal sent by the receiver is used for notifying the peripheral device that the channel is being used, so that the vicinity node or device stops transmitting information or changes the direction or range or power of the transmitting beam.

In addition, a position where the receiving party sends the indication signal may be determined by at least one of the following manners: the position is appointed by the base station and the user equipment (UE) in advance; the position is notified by physical layer DCI; the position configured by higher layer RRC signaling; and the position is a predefined position.

In the data reception process, the receiving party sends the indication signal multiple times, the indication signal may be sent periodically. The sending positions of the indication signal may be determined by at least one of the following parameters: a sending position where the indication signal is sent for the first time, an interval between two sending position of the indication signal, and a sending position where the indication signal is sent for the last time. The parameters may be determined by at least one of: the position appointed by the base station and the UE in advance; the position notified by physical layer DCI; the position configured by higher layer RRC signaling; the predefined position and a appointment of the sending party and the receiving party.

Optionally, the directions of one or more transmitting beams used by the receiving party for sending the indication signal may be the beam direction directed to the target node, or be different from the beam direction directed to the target node. Alternatively, the directions of the multiple transmitting beams are different from each other.

The indication signal sent by the receiver may carry at least one of the following information: an occupation signal duration, an operator identifier, a cell identifier, a terminal identifier, a sector identifier, a beam direction, a beam sending direction, a beam arriving direction, a base station identifier, a power, and a channel state identifier.

The time when the receiver sends the signal may be before the period of receiving the information sent from the sender, or may be in the period of receiving the information sent from the sender. For the latter, the receiving device may sent the signal once in the period of receiving the information sent from the sender, or the receiving device may sent the signal periodically the period of receiving the information sent from the sender. The beam directions for periodically sending the signal may be the same or different. The sequences sent in the beam directions may be the same or different. The direction for sending the signal may be the same as the direction of the beam for signal reception, or may be different from the direction of the beam for signal reception.

Figure 9:
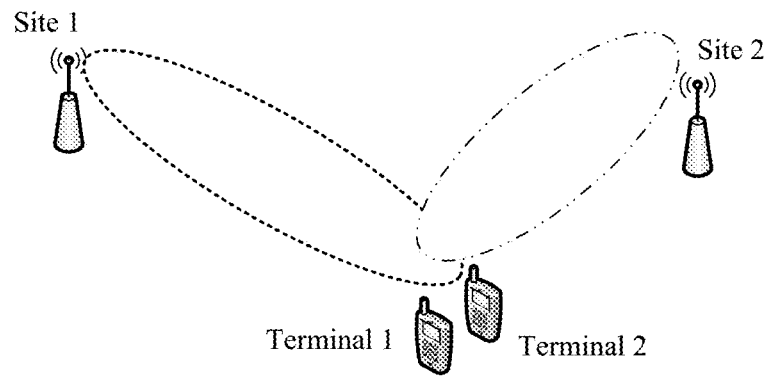
FIG. 9 is a schematic diagram showing an implementation principle of the signal transmission method according to an embodiment two of the present disclosure.

The method described in the embodiment will be described below by using FIG. 9 as an example.

It is assumed that a site 1 sends information to a terminal 2 and a site 2 sends information to a terminal 1. The site 1 is far away from the site 2, and the terminal 1 is adjacent to the terminal 2, and the terminal 2 is located within the coverage of the beam by which the site 1 sends information to the terminal 1. The information includes at least one of the following: data, control, acknowledgment information and indication information. Based on the above network configuration, the site 1 performs the CCA detection before transmitting information to the terminal 2, and detects that the channel is idle, the terminal 2 also performs the CCA detection and detects that the channel is idle. In this case, the site 1 starts to send data to the terminal. To prevent the terminal 1 from interfering the terminal 2, the terminal 2 may also send a signal to notify the vicinity nodes that the channel is being used in addition to receive the signal from the site 1. Before the terminal 1 transmits information with the site 2, the terminal 1 performs the CCA detection and finds that detected energy is greater than a preset threshold, the terminal 1 determines that the channel is unavailable, or the channel is busy, or there exists interference in the vicinity. The terminal 1 notifies the site 2 of the CCA detection result of the terminal 1, so that the site 2 stops transmitting information to the terminal 1. The beam direction used by the terminal for sending the notification signal may be directed to the terminal 1. Alternatively, the terminal 2 sends an omnidirectional signal. Alternatively, the terminal 2 sends signals (sends signals in multiple directions at the same time) to the vicinity nodes according to the measurement result or the positions of the peripheral neighboring nodes.

The operations that the site 1 and the terminal 2 can perform one of the following operations before transmitting information with each other. Here, the site 1 is the sender and the terminal 2 is the receiver, or the site 1 is the receiver and the terminal 2 is the sender. The embodiment is only an example but the method is universal. Specifically:

(1). At least one of the site 1 and the terminal 2 performs the CCA detection and detects that the channel is idle, and the site 1 starts to transmit data to the terminal 2.

(2). At least one of the site 1 and the terminal 2 performs the CCA detection and detects that the channel is idle, the terminal 2 sends information to the site 1. This information is used for notifying the site 1 that the receiving side detects that the channel is idle and available for information transmission. In addition, optionally, after receiving the information from the terminal 2, the site 1 may reply to the terminal 2 with acknowledgement information. The acknowledgement information is used for notifying at least one of: the information being received and the sending side detecting that the channel is also available.

(3). At least one of the site 1 and the terminal 2 performs the CCA detection and detects that the channel is idle, and sends information to the counter party.

For example, the site 1 detects that the channel is idle and sends information to the terminal 2. If the terminal 2 receives the information from the site 1, it indicates that the sending side channel is idle or there exists no interference. In addition, optionally, it is implicitly known that the channel around itself (the terminal 2) is idle and available, or there exists no interference. Similarly, if the site 1 receives information from the terminal 2, it indicates that the receiver side channel is idle and available, or there exists no interference around the channel. In addition, optionally, it is implicitly known that the channel around itself (the site 1) is idle and available, or there exists no interference. In response to failing to receive the information from the counter party, it is determined that the channel at the counter party is unavailable or busy, or the interference is serious, or there is a site around itself that starts sending information, or there exists interference around itself.

(4). At least one of the site 1 and the terminal 2 performs the CCA detection and detects that the channel is idle, and sends a first message to the counter party. After receiving the first message from the counter party, the party receiving the first message replies to the counter party with a second message. The second message is used for notifying the counter party at least one of: receiving the information that the channel is idle, and data or information transmission being executable. If the party sending the first message fails to receive the second message from the counter party, it is determined that the channel at the counter party is unavailable or busy, or the interference is serious, or there is a site in the vicinity of the party sending the first message is sending information, or there is interference in the vicinity of the party sending the first message.

Embodiment Three

The present embodiment focuses on a case where a transmission device has occupied the channel. If the sender sends data only in a beam range (the beam may be a narrow beam or a wide beam), the problem of hidden nodes is caused. In order to avoid this, this embodiment provides a method of solving the problem of hidden nodes of the sender when the sending device occupies the channel and begins to perform the transmission.

One solution is: the sending device sends an indication signal for one or more times in an interval in data transmission.

A position where the sending party sends the indication signal may be determined by at least one of the following manners. The position is appointed by a base station and a user equipment (UE). The position is notified by physical layer DCI. The position is configured by higher layer RRC signaling. The position is a predefined position.

When the sending party sends data, the sending party sends the indication signal multiple times. The indication signal may be sent periodically. The positions for sending the indication signal multiple times may be determined by at least one of the following parameters: a sending position where the indication signal is sent for the first time, an interval between two sending positions of the indication signal, and a sending position where the indication signal is sent for the last time. The parameters may be determined by at least one of: a position appointed in advance by a base station and a user equipment (UE); a position notified by physical layer DCI; a position configured by higher layer RRC signaling; a predefined position, and an appointment of the sending party and the receiving party.

Optionally, the directions of one or more transmitting beams used by the receiving party for sending the indication signal may be the beam direction directed to the target node, or be different from the beam direction directed to the target node. Alternatively, the directions of the multiple transmitting beams are different from each other.

The indication signal sent by the sending party may carry at least one of the following information: an occupation signal duration, an operator identifier, a cell identifier, a terminal identifier, a sector identifier, a beam direction, a beam sending direction, a beam arriving direction, a base station identifier, a power and a channel state identifier.

The channel or signal sent by the sender is used for notifying a device in the vicinity of the sender that the unlicensed carrier has been occupied. The beam direction for sending the signal or the channel may be the same as the beam direction for sending a signal to the receiver, or may be a direction different from the beam direction for sending a signal to the receiver. In addition, the sequences sent in the beam directions may also be the same or different.

It is assumed that the sender is a base station. The operation of the base station may include the following cases.

(1). The base station detects that the channel is idle and broadcasts a signal to vicinity nodes. The node that receives the broadcast signal may perform at least one of the operations described below.

Operation one, the node that receives the broadcast signal stops sending data or does not send data.

Operation two: in the case where the base station sending the broadcast signal also receives broadcast information sent by the vicinity node, the sites negotiate a period for occupying the channel, or randomly select a site and the selected site performs muting without data transmission, or negotiate to change the beam direction, or acknowledge that their beams are spatially orthogonal according to received broadcast information and both parties can perform data transmission.

Figure 10:
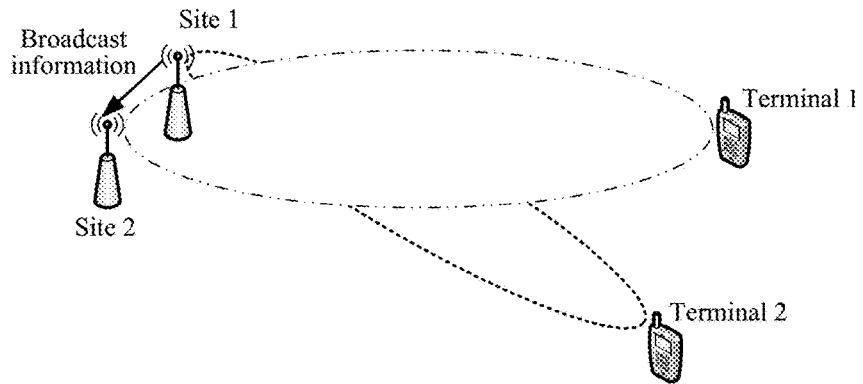
FIG. 10 is a schematic diagram showing another implementation principle of the signal transmission method according to an embodiment three of the present disclosure.

For example, as shown in FIG. 10, the site 1 and the site 2 receive the information broadcasted by each other, and learn at least one of the channel occupying time of each other and the beam direction of each other, so that the site 1 and site 2 can send data in the time division multiplexing manner. Alternatively, one of the site 1 and the site 2 modifies the beam direction (at least one of the direction of the transmitting beam and the direction of the receiving beam), so that the site 1 and the site 2 do not interfere with each other. Alternatively, after the site 1 detects that the channel is idle, the site 1 broadcasts a message indicating the channel is occupied to the site 2. After the site 2 receives the broadcast message from the site 1, even if the site 2 detects that the channel is idle, the site 2 should stop performing the data transmission. Alternatively, after the site 2 receives the broadcast message from the site 1, the site 2 learns the beam used by the site 1 for signal transmission is spatially orthogonal with the beam used by the site 2 for signal transmission or reception, and then the site 2 may perform information transmission.

(2) After the base station detects that the channel is idle, in the period the base station occupies the channel, the base station sends a signal to the vicinity node. If the base station sends the broadcast signal for one time in the period the base station occupies the channel, the processing manner is the same as that described in (1). If the base station periodically sends the broadcast signal for multiple times in the period the base station occupies the channel, the processing manner includes one of the following manners.

In a manner one: the base station sends the broadcast signal in a different beam direction each time.

In a manner two: the base station sends the broadcast signal in the same beam direction each time.

In a manner three: the base station sends the broadcast signal with a different sequence each time.

In a manner four: the base station sends the broadcast signal with a different sequence each time.

In a manner five: the base station sends the broadcast signal in a combination of the above manners. For example, the base station sends the broadcast signal with a same sequence but using a different transmitting beam direction each time. Alternatively, the base station sends the broadcast signal with a different sequence and with a same transmitting beam direction each time.

A period of the broadcast signal may be determined by at least one of the following manners. The period is appointed by base stations in advance. The period is appointed by the base station and the UE in advance. The period is predefined.

The processing manner of the UE side is the same as the processing manner of the base station side.

Optionally, in order to prevent the data transmission between the sending device and the receiving device from being disturbed by the vicinity hidden nodes, the device may perform at least one of the indication signal operation and the acknowledgement signal operation for one or more times, which similar to RTS/CTS. That is, during the data transmission, the sending device performs at least one of sending the indication signal similar to the RTS on a specific resource position, and receiving the indication signal, similar to the CTS, sent or fed back by the receiving device.

That is, for the indication signal/acknowledgement signal similar to the RTS/CTS, at least one of a time domain position, a frequency domain position and a spatial domain position for sending the indication signal for the first time during the transmission may be determined in one of the following manners: the position is appointed by the base station and the user equipment in advance; the position is notified by physical layer DCI; a position is configured by higher layer RRC signaling; the position is a predefined position; and the position is appointed by the sending party and the receiving part in advance. If at least one of the indication signal and the acknowledgement signal is sent multiple times during the transmission, a time interval or a period parameter is introduced. The time interval between the indication signal and the acknowledgement signal may be 0.5 us, 1 us, 1.5 us, 2 us, 3 us, 4 us, 5 us, 6 us, 9 us, 16 us, 25 us or a value acquired by an arithmetic operation of the above values (the arithmetic operation includes at least one of: addition, subtraction, multiplication, division and at least one of the above mixed operations, for example, the time interval is 16 us+3*9, which equals to 43 us). Alternatively, the time interval is determined according to a certain subcarrier interval ratio change and the above values (for example, the subcarrier interval changes from 15 kHz to 7.5 kHz, the interval duration is doubled accordingly, i.e., 4 us, 8us, 18 us or 32 us). Alternatively, the time interval is consistent with a feedback time interval specified in Wi-Fi. Alternatively, the time interval is in one time window.

Embodiment Four

In addition to adopt the methods in the embodiments 1 to 3, this embodiment provides a method to reduce or prevent the problem of hidden nodes by using at least one of coordination between transmission nodes, scheduling and interference reporting mechanism. The transmitting nodes may be at least one of a base station and a UE.

A network or a central control node (e.g., the base station) allocate at least one of the time domain resource, the frequency domain resource, and the spatial domain resource used for transmission for at least one of a subordinate cell, the base station and the UE in advance.

Firstly, different transmission node pairs (which includes the sending transmission node and the receiving transmission node) perform transmission in a time division manner. For example, a transmission node A and a transmission node B are denoted as a transmission node pair AB, and a transmission resource allocated by the central control node is denoted as a transmission opportunity 1, and a transmission node C and a transmission node D are denoted as a transmission node pair CD, and a transmission resource allocated by the central control node is denoted as a transmission opportunity 2.

Secondly, the first transmission node pair performs a CCA detection on the resource of the transmission opportunity 1 and detects that the channel is idle, and the transmission is started. The second transmission node pair is waken up to perform the CCA detection on the resource of the transmission opportunity 1 and generates an interference report. Similarly, when the second transmission node pair performs the CCA detection successfully and performs transmission, the first transmission node pair is waken up and performs the CCA detection and generates the interference report. Optionally, during the CCA detection, antennas of the transmission node pair AB and the transmission node pair CD are configured in an antenna mode for the subsequent data transmission.

Thirdly, the transmission node or the transmission node pair that is waken up for performing the CCA detection reports the interference report to the network or the central control node. The object is that the network or the central control node coordinates at least one of the time domain resources, the frequency domain resources and the spatial domain resources of the transmission node pairs.

If the interference reported by the transmission node or the transmission node pair that is waken up for performing the CCA detection satisfies a certain threshold value, it is determined that the interference exist in at least one of the first transmission node pair and the second transmission node pair. The network or the central control node needs to further adjust resource allocation of the two transmission node pairs. For example, the transmission pair AB and the transmission pair CD have interference in the spatial domain, and the central control node may need to separate the transmissions of the two transmission node pairs in at least one of time and frequency.

Otherwise, if the interference reported by the transmission node or the transmission node pair that is woken up for performing the CCA detection does not satisfy a certain threshold value, it is determined that no interference exists in at least one of the first transmission node pair and the second transmission node pair. Next time, the two transmission node pairs may perform transmission in the same time period. Since the beams of the two transmission node pairs are orthogonal, namely, the beams support the spatial division multiplexing. The two transmission node pairs may be in the frequency division multiplexing mode in the same time period, or share the same time frequency domain resource. In addition, the two transmission node pairs may perform transmission in space division multiplexing mode, or may perform the CCA detection and generate the interference measurement report.

Optionally, when two transmission node pairs perform transmission in the space division manner, if a transmission node finds that it cannot receive correct data, the transmission node sends the interference measurement to the network or the central control node, such that the network or the central control node adjusts or schedules at least one of the time domain resources, the frequency domain resources and the spatial domain resources of the transmission node pairs. For example, the transmission node pairs perform transmission in the space division mode, but cannot receive data correctly due to serious interference, and then the transmission node pairs may adjust the multiplexing mode from the space division multiplexing mode to the time division multiplexing mode.

Before the transmission node or the transmission node pair perform transmission, the transmission node or the transmission node pair needs to perform the CCA detection, or does not need to perform the CCA detection. If the CCA detection is successful, the data transmission may be performed. Otherwise, the data transmission cannot be performed.

The manner of reporting the interference measurement includes at least one of: reporting the interference measurement periodically, reporting the interference measurement based on an event, or reporting the interference measurement reporting the interference measurement based on triggering of signaling or an implicit triggering.

The period for reporting the interference measurement periodically may be 0.5 ms, 1 ms, 2 ms, 3 ms, 4 ms, 5 ms, 10 ms, or various arithmetic combinations of the above values, or integer multiples of the above values, etc. The period of the interference measurement reporting may be appointed by the base station and the UE in advance, or notified by physical layer DCI signaling, or notified by the higher layer RRC signaling, or predefined.

The reporting based on an event may be understood as reporting the interference amount in response to determining that the measured interference amount exceeds a certain threshold value.

The reporting based on based on triggering of signaling or an implicit triggering may be understood as physical layer signaling (physical layer DCI signaling, including UL grant or DL grant) or higher layer signaling (such as RRC signaling) triggers the interference reporting. The implicit triggering may be understood as the interference measurement result reporting is triggered by the transmission node detecting the end of the transmission ends or the start of the transmission, or detecting a specific reference signal.

At least one of a time domain position and a frequency domain position for sending the interference measurement result may be appointed by the base station and the UE in advance, or notified by physical layer DCI signaling, or notified by the higher layer RRC signaling, or predefined. Optionally, the time domain position may be a specific symbol in a subframe or a transmission unit (the transmission unit may include one or more subframes or short TTIs), such as the last symbol, the first symbol, the second symbol or the last symbol in a slot. The frequency domain position may be the whole bandwidth or a specific frequency domain resource position on the frequency domain.

Embodiment Five

This embodiment provides a signal design method. The signal design is applicable to the signal or the acknowledgment signal involved in this embodiment, but is not limited to the signal of the embodiment in the present disclosure and may be applicable to the design of any other signals.

Figure 11:
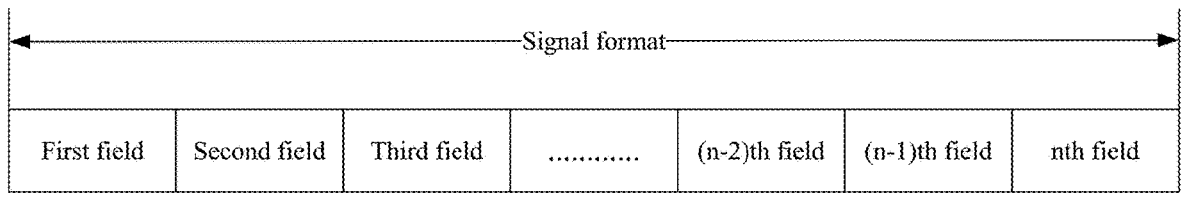
FIG. 11 is a schematic diagram of a signal format according to an embodiment five of the present disclosure.
Figure 12:
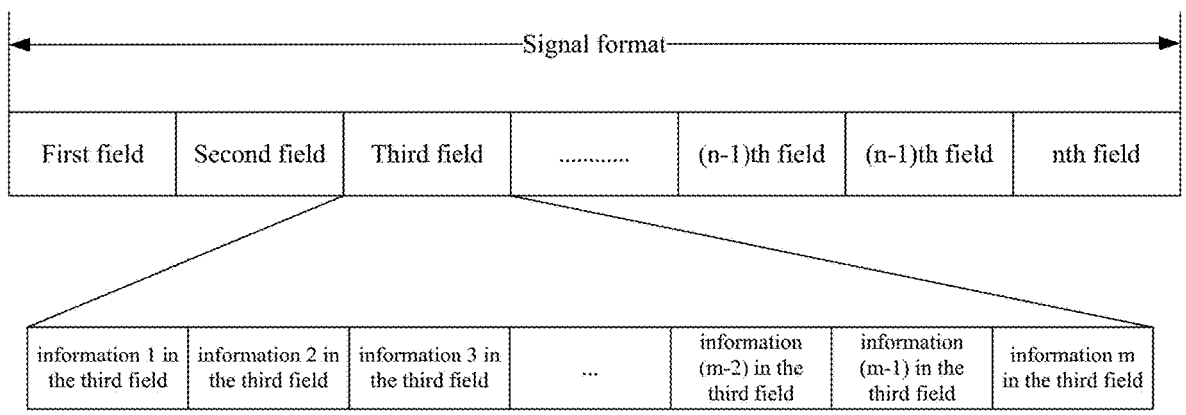
FIG. 12 is a schematic diagram of another signal format according to the embodiment five of the present disclosure.

Through this embodiment, the transmission node transmits the signal in a certain format in the information transmission. The format of signal transmission may include n information fields. Information in the n information fields may have the same function or meaning, or different function or meanings. The value of n may be determined in advance or determined by information carried in the signal. Each information field may include m different indication manners, and the specific signal format is shown in FIGS. 11 and 12.

Figure 13:
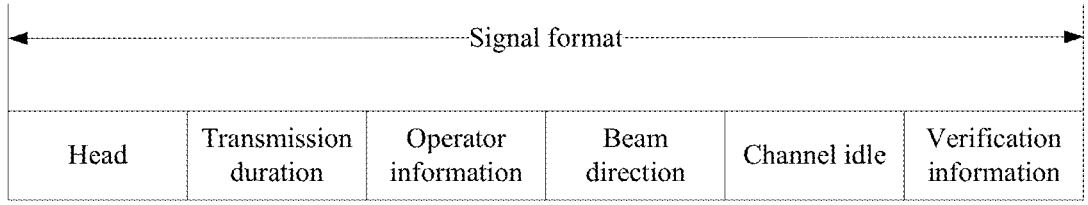
FIG. 13 is a schematic diagram of a signal format in actual use according to the embodiment five of the present disclosure.

In this embodiment, the signal may include at least one of: a head, a transmission duration, an operator identifier, a device identifier, a sector identifier, a training sequence identifier, a beam direction, a signal or beam sending direction, a signal or a beam arriving direction, verification information, an indication identifier, a channel state identifier, data, a multiplexing indication, frequency domain information, a power, MCS, a LBT type and interference measurement information. As shown in FIG. 13, the signal carries head information, the transmission duration, the operator identifier, the beam direction, a signal state identifier and the verification information.

For the signal format shown in FIG. 13, if the signal is sent by the base station to the terminal, the head information includes the cell identifier or the base station identifier. The terminal receiving the signal first determines whether the information is sent by its own cell. In response to determining that the information is sent by its own cell, the UE may parse the content of the signal, and may learn the channel being idle, the occupation time, the beam sending direction, the beam arriving direction and the beam width. The UE determines whether the signal is parsed correctly according to the verification information. If the signal is sent by the terminal to the terminal, the content of the head includes, optionally, the terminal identifier information, the cell identifier, the base station identifier or the operator identifier are filled in. In the case where the content of the head includes the operator identifier, the receiver needs to determine whether the signal is sent by the target terminal by parsing the content carried by the signal. In the case where the content of the head includes the base station identifier, the base station receiving the signal may learn whether the signal is sent by the terminal belongs to the base station according to the head information, and the base station further parses the content carried by the signal, such as whether the channel on the terminal side being idle and the beam direction. In addition, if multiplexing is between base stations, or between cells or between terminals, the head may include operator information or base station information for other node to identify whether the signal is sent by a node of its own cell or operator, such that other node learns whether the channel may be multiplexed.

The number of parameters in the above signal may be one or more. For example, the sector identifier may be a sector identifier 1, and may also be a sector identifier 1, a sector identifier 2, a sector identifier 3, . . . and a sector identifier n, etc. The beam sending direction parameter in the beam direction parameter may be a beam sending direction A1, and may also be a beam sending direction A1, a beam sending direction A2, a beam sending direction A3, a beam sending direction A4, a beam sending direction A5 . . . a beam sending direction An, etc. Other parameters are similar. The device identifier may include at least one of: the cell identifier, the base station identifier and the terminal identifier. The channel state identifier includes at least one of: the channel is idle and the channel is busy. Any information indicating the device may be filled or placed in the head, such as the cell identifier, the UE identifier, or the physical layer or the Mac layer identifier, etc. The frequency domain information includes at least one of: a frequency domain length, a frequency domain start point, a frequency domain end point, and a frequency domain interval.

Embodiment Six

This embodiment provides a manner of processing multiplexing between transmission nodes in the same system.

The multiplexing between transmission nodes in the same system may be performed according to at least one of the manners described below.

In a manner one, in an early stage of the channel occupation, the multiplexing between transmission nodes is implemented by detecting the signal or information carried in the signal.

In the early stage of the channel occupation, the transmitting node (a base station or a UE) detects that the channel is idle, and sends a signal to a receiving side transmitting node for notifying the receiving party that the channel at the sending party is idle and available for transmission. In this case, nodes in the vicinity of the transmission node sending the signal receive the signal. By parsing the content carried in the signal, the vicinity node knows that the transmission node sending the signal and the vicinity node itself belong to the same operator or knows that the transmission node in the same cell occupies the channel. Optionally, if the signal carries at least one of a multiplexing indication, a beam direction, a transmission duration, and a training sequence, the node detecting the multiplexing indication can adjust or determine at least one of its own beam direction, its own transmission duration, its own training sequence and its own sending power according to at least one of the beam direction, the transmission duration, and the training sequence in the signal, thereby avoiding the interference to each other.

In a manner two, in a transmission period, the multiplexing between transmission nodes is implemented by detecting a specific signaling the transmission period.

The specific signal may be at least one of: a reference signal, an identification signal and a pattern signal. The reference signal may be an existing uplink reference signal, an existing downlink reference signal, a new designed uplink reference signal or a new designed downlink reference signal. The identification signal may be defined in advance, appointed by the base station and the UE, appointed by base stations, indicated by higher layer RRC signaling, indicated by the base station to the UE, or indicated by physical layer DCI signaling for identification by the receiving side node. The pattern signal means that in a certain time range, the signal does not occupy a specific resource in the frequency domain, and the signal is used for the identification by the receiving party node.

The position of the specific signal in the transmission period may be predefined, or appointed by the base station and the UE, or appointed by base stations, or indicated by higher layer RRC signaling, or indicated by the base station to the UE, or indicated by the physical layer DCI signaling. In addition, the specific signal may be send once or multiple times during the whole transmission period. The specific signal may be send multiple times with a regular interval (i.e., the specific signal is sent periodically during the transmission period), or the specific signal may be send multiple times with different intervals, which may provide more opportunities for the node participating in multiplexing, and improves resource utilization.

In a manner three, in the transmission period, multiplexing is implemented by sending the signal in other directions or antennas. The reason for sending the signal in other directions or antennas is as follows. On one hand, other transmission nodes unavailable for the multiplexing detect the signal and know that the channel has been occupied, on the other hand, the transmission nodes available for the multiplexing is notified that the signal is occupied by the node sending the signal. The signal is provided to the transmission nodes of the same cell, or the same operator or the same group to perform the multiplexing.

Embodiment Seven

This embodiment provides a processing manner of multiplexing between different systems.

For multiplexing between base stations of different systems, through information interaction through an X2 interface between the base stations, the base station may acquire information whether multiplexing between base stations of different systems can be performed. For example, for implementing the multiplexing of at least one of the time domain, the frequency domain and the spatial domain between sites of the different systems, the followings may be interacted through the X2 interface: a predefined signal, information or channel, frequency domain resource information, a transmission duration on a time domain, and at least one of a sending direction of a beam, a beam width, weight information, sequence information and system identifier on the spatial domain.

For multiplexing between terminals of different systems, at least one of the time domain information interaction, the frequency domain information interaction and the spatial domain information interaction between terminals of different systems may be implemented by technologies between Internet of Things or terminals such as D2D, V2V and V2X, such that the multiplexing object is achieved. The interacted information is with a base station side.

Embodiment Eight

The embodiment provides a channel access method in a high frequency scenario. This embodiment focuses on the premise of transmitting on an unlicensed carrier from the perspective of LBT and without performing the LBT mechanism while using the resource negotiating manner. The method in the present embodiment or the embodiment of the present disclosure is not limited to the unlicensed carriers, and may also be applied to shared carriers or licensed carriers.

A channel access manner applicable to a new scenario is designed for bandwidths and characteristics corresponding to at least one of different scenarios and various scenarios in 5G The scenarios may be the high frequency scenario or the low frequency scenario. In the scenarios, there are three different traffic, such as eMBB, mMTC and URLLC.

In at least one of the new traffic and scenario, when selecting various OFDM parameters, there is a trade-off between multiple requirements. In general, he parameters bandwidth, bit rate, and delay spread are considered firstly. The delay spread directly determines the length of a guard period, i.e., the length of the guard period is n to m times of a root-mean-square of the delay spread. The values of m and n may be the same or different. Optionally, m is greater than n or is greater than or equal to n, and both m and m are positive integers. Optionally, n, m is one of the following values: 2, 3, 4, 5, 6, 7, 8, 9, 10, etc. The symbol length is larger than the length of the guard period, but symbol length cannot be arbitrary large. If the symbol length is too large, there will be more subcarriers in the system, thereby reducing the subcarrier interval and increasing the system complexity. Moreover, a peak-to-average power ratio of the system may be increased and the system is more sensitive to the frequency deviation. Therefore, generally, the symbol length is selected to be p times of the length of the guard period, where p is a positive integer, optionally, is 4, 5, 6, 7, 8, 9, 10, etc. After determining the length of the guard period and the symbol length, the number of subcarriers may be obtained by dividing bandwidth or −3 db bandwidth by the subcarrier interval, or the number of subcarriers is determined by dividing a required bit rate by a bit rate of each subchannel. The length of the subcarrier interval is a reciprocal of the symbol length. The transmission bit rate of each subchannel may be determined by a modulation type, a coding rate and a symbol rate.

A requirement for selecting OFDM parameters is that the number of samples should be an integer in FFT/IFFT operation time and a symbol interval.

A channel access method is provided based on at least of the consideration of the above parameters, and LBT problem brought by the beamforming technology in at least one high frequency scenario.

In a manner one, for the low frequency, when at least one of the three traffic in the NR system is applied to the unlicensed carrier, the transmission device in the NR system still needs to perform the LBT. When the LBT is performed successfully, the transmission device is allowed to perform transmission on the unlicensed carrier, or the transmission device is considered to acquire a right to use the unlicensed carrier.

For the low frequency, the channel access process specified by standards in the existing Rel-13 version may be used. However, the transmission bandwidth, the subcarrier interval, the symbol length of different traffic in the NR system are all different from that in the existing LTE system, so that based on the parameters in the new system or traffic, relevant parameters in the corresponding channel access LBT process also should be modified accordingly, or modified proportionally.

The subcarrier interval includes two categories: one is 7.5 kHz family, and the other is 15 kHz family. In each family, the relationship of the subcarrier intervals is 7.5*2n or 15*2n. n is an integer and may be 0, 1, 2, 3, 4, 5, 6, 7, 8, 9, 10, etc. The symbol length is a reciprocal of the length of the subcarrier interval. The number of symbols in the subframe changes accordingly based on the change of the symbol length. The time length of the subframe may be 1 ms, 0.5 ms, 0.25 ms and 0.125 ms.

The system bandwidth may be one of: 5 MHz, 10 MHz, 15 MHz, 20 MHz, 40 MHz, 60 MHz, 80 MHz, 100 MHz, 120 MHz, 140 MHz, 160 MHz, 180 MHz, 200 MHz, 700 MHz, 800 MHz, 1 GHz, 2 GHz, 2.5 GHz, 3 GHz, 3.5 GHz, 4 GHz, 5 GHz, 6 GHz, etc.

For example, it is assumed that the subcarrier interval is 60 kHz and the symbol length is 16.67 us. Correspondingly, a duration of a defer period in the LBT process should also be modified according to the ratio. For example, the duration of the defer period is a fixed duration (such as 16 us) plus p slot durations. Under the new subcarrier interval and symbol duration, the fixed duration may be unchanged or determined according to the ratio (a ratio of an original subcarrier interval 15 kHz to a new subcarrier interval 60 kHz). For example, the fixed duration is 16 us/4=4 us. In addition, in a case of a 15 kHz subcarrier, the slot duration is 9 us. In a case of a 60 kHz subcarrier, the slot duration may be 9 us/4=2 us, or 3 us. In addition, at least one of a size of a maximum contention window, a size of a minimum contention window and the transmission duration also should be modified accordingly, or not modified. Optionally, LBT parameters corresponding to different priority levels are not modified under at least one of the new subcarrier interval and the symbol length. Alternatively, at least one of p, the size of the minimum contention window size, the size of the maximum contention window and the transmission duration is modified according to the ratio. The ratio is a ratio of an old subcarrier interval to the new subcarrier interval, or a ratio of an old symbol length to a new symbol length.

The method determining other parameters in the LBT process based on the size of the subcarrier interval or the symbol length is the same as the above description.

In a manner two, for the high frequency, when at least one of the three traffic in the NR system is applied on the unlicensed carrier, the signal transmission is in a narrow beam range, so that before the transmission device performs transmission, the manner of performing the LBT needs to be optimized or modified, thereby solving the hidden node problem in a certain extent, which is further aggravated because the beamforming is introduced in the high frequency.

In the high frequency scenario where the beamforming technology is introduced, when detecting whether the channel is busy or idle, if the channel is detected to be idle, the channel actually is not idle. This is because the signal sent by the device is only concentrated in a certain beam direction range, causing that a vicinity device cannot detect the energy of the channel. In the embodiment of the present disclosure, the problem of hidden nodes is alleviated by a method of sending the signal in multiple different directions by the sending device or the receiving device. So that a detection device may need to perform multiple detections to improve channel detection accuracy. On this basis, some detection modules may be introduced to the existing LBT process, or a detection duration of the existing detection module may be increased or decreased. The new added detection modules may locate ahead of or behind an execution unit of the existing LBT process. The execution unit of the existing LBT process includes: a defer period detection module, a random back-off value N determination module, a N value progressive decreasing module, a N value generation module, a slot duration detection module in eCCA.

In a manner three, the transmitting of the transmission node on the unlicensed carrier is implemented in a resource negotiation manner.

Due to high frequency features, the link loss is large, and beamforming technology needs to be adopted. As a result, due to the introduction of beamforming technology, each device only transmits signals in a narrow beam range, which makes the problem of the hidden nodes more serious in the high frequency scenario. Therefore, it is inappropriate for base station to judge whether the channel is idle by using the LBT. On this basis, when the device performs transmission on the unlicensed carrier or the shared carrier, the LBT mechanism may be not performed, information such as the position of the transmission resource is determined in the manner of resource negotiation between devices.

At least one of a time domain resource, a frequency domain resource and a spatial domain resource is determined by negotiation between nodes of the same system/nodes of different systems/operators in different scenarios or the same scenario. Specifically:

The time domain resource includes at least one of the following: a time domain start position, a transmission length, a time domain end position, an interval between time domain resources, an interval between two transmissions and a period.

The frequency domain resource includes at least one of the following: a frequency domain start position (a reference frequency domain may be a bandwidth in the same scenario or a whole system bandwidth), a frequency domain length, a frequency domain interval and a frequency domain resource size.

The spatial domain resource includes at least one of the following: a beam direction or a direction set, a weight or a weight set.

In addition, power domain information may also be negotiated.

At least one of the time domain resource, the frequency domain resource, and the spatial domain resource occupied by different transmission nodes or different systems may be interacted through an air interface between base stations, predefined, or determined by negotiation between the UE and the UE.

At least one of the time domain resource, the frequency domain resource, and the spatial domain resource, and a parameter constituting at least one of the time domain resource, the frequency domain resource, and the spatial domain resource may be determined by one of the following manners: appointment by the base station and the UE in advance, negotiation by the base stations through an X2 interface or other interfaces, interactive negotiation between the UE and the UE through an end-to-end interface, an appointment between the base stations, an appointment between the UE and the UE, a predetermined manner, a physical layer DCI signaling indication or a high layer RRC signaling indication.

Statement: the LBT mechanism may adopt one of the following:

(1) Before the burst starts, the transmission node (at least one of the sender and the receiver) adopts a Cat4 LBT mechanism. Parameters adopted by the specific Cat4 LBT mechanism may be LBT parameters according to the traffic type, the channel/signal type or priority levels corresponding to the packet size.

(2) In the burst, the transmission node (at least one of the sender and the receiver) adopts a Cat2 LBT mechanism. Start time for performing the Cat2 LBT may be randomly selected (over a period of time), or a fixed position (a start point of the fixed position may be a preset fixed position within a period of time, or a position in front of the transmission start time by a CCA duration).

For different scenarios or different traffic, the LBT may be performed on a non-full bandwidth frequency domain, or a full bandwidth frequency domain. For the full bandwidth LBT, once the channel is detected to be idle, the whole bandwidth is occupied. For the non-full bandwidth LBT, the CCA detection is performed in bandwidths, on which bandwidth the CCA is successful, the bandwidth is occupied.

In addition, in the CCA detection process, in addition to adopting the energy detection method, the signal detection method may also be adopted.

Embodiment Nine

The embodiment provides a CCA detection threshold calculation method for different signals or channels under a large bandwidth.

Different traffic types in NR correspond to different bandwidths. Under a new bandwidth, the energy threshold of the CCA detection also needs to be modified. For example, the threshold corresponding to a 20 MHz bandwidth is −62 dbm; the threshold corresponding to a 40 MHz bandwidth is increasing −62 dbm by 10*log 10(40/20)=3, and so on. For larger bandwidth, an offset or a manipulated value of the detection threshold may be determined according to a ratio (such as 10*log 10 (a first bandwidth/a second bandwidth)).

For the same system, different CCA thresholds are configured according to different signals or channels. Different CCA thresholds are configured for different systems or different scenarios. In the same system or the same scenario, the same threshold is configured, but different thresholds are configured for different signals or channels.

For large bandwidths, different scenarios, different signals or different channels, the energy detection threshold may equal to the current energy detection threshold plus an offset. The current energy detection threshold is determined as follows:

For DRS without PDSCH:

(1). If other technologies are not allowed to share carriers, the maximum energy detection threshold is Min(X, Y). X=−75 dBm/MHz+10*log 10 (BWMHz)+10 dB and Y is the maximum energy detection threshold specified in the regulation, or Y=X.

(2) If other technologies are allowed to share the carriers, the maximum energy detection threshold is TH=max (−72 dBm (20 MHz), min(Tmax, Tmax−5 dB+($P_H$−$P_{TX}$))). $P_H$ is a reference power and is 23 dBm by default. $P_{TX}$ is the maximum transmission power on the configured carrier. Tmax=−75 dBm/MHz+10*log 10(BWMHz).

For the Cat4LBT process: for the case (1), the maximum energy detection threshold is unchanged; for the case (2), the "min" expression in the TH formula is decreased by 5 dB and is min(Tmax, Tmax−10 dB+($P_H$−$P_{TX}$)).

In the new scenario, the energy detection threshold of a DRS signal or other signals and channels or an access processing may use the threshold calculation formula in the (1) or (2) described above by adding an offset.

For example, for the case (1), the new maximum energy detection threshold may be Min(X, Y)+offset1. Alternatively, Min(X, Y) formula is unchanged and the value of X is modified, where X=A dBm/MHz+10*log 10(BWMHz)+B dB+offset1, and A may be −75 dBm/MHz, or −75 dBm/MHz plus an offset2. B may be 10 dBm, or 10 dBm/MHz plus an offset3. For the case (1), the new maximum energy detection threshold may be TH=max(−72 dBm (20 MHz), min(Tmax, Tmax−5 dB+($P_H$−$P_{TX}$)))+offset4. Alternatively, the formula TH=max(−72 dBm (20 MHz), min(Tmax, Tmax−5 dB+($P_H$−$P_{TX}$))) is still used and the values of parameter in the TH are modified. For example, in TH=max(P1 dBm (BWMHz), min(Tmax, Tmax−P2 dB+ ($P_H$−$P_{TX}$))), for the 20 MHz bandwidth, the value of P1 is −72 dBm, and for other bandwidths, the value of P1 is −72 dBm in the 20 MHz bandwidth plus 10*log 10 (the first bandwidth/the second bandwidth) or plus an offset5. Here, the second bandwidth is the 20 MHz bandwidth, and the first bandwidth is a new bandwidth. The value of P2 in the 20 MHz bandwidth is 5 dB, and may be 5 dB plus an offset6 in other bandwidths. Tmax may be −75 dBm/MHz+10*log 10(BWMHz), or Tmax=−75 dBm/MHz+10*log 10(BWMHz)+offset7 or Tmax=−A dBm/MHz+10*log 10(BWMHz).

For at least one of the situation of different scenarios and the situation of different channels or signals, the values of the parameter in the formulas in case (1) and/or case (2) described above may be different or the same. For a case where the values of parameter are different, the values of the parameter may have an offset in different scenarios, or different signals or channels. The offset1, the offset2, the offset3, the offset4, the offset5, the offset6, the offset1, the offset, the A, the B, the P1 and the P2 may be positive real numbers and negative real numbers. Optionally, they are ±1, ±2, ±3, ±4, ±5, ±6, ±7, ±8, ±9, ±10, ±11, or a value which is greater than 11 and less than Q, and the unit is dBm or dB. Q or the above offsets may be predefined, configured by higher RRC signaling, appointed by the base station and the UE in advance, or indicated by physical layer DCI signaling.

Embodiment Ten

For the case of multi-user multiplexing, the case of frequency multiplexing between cells of the same operator, or the case of frequency multiplexing between operators, due to at least one of co-channel interference and adjacent-channel interference, a blockage problem occurs between transmission nodes. On this basis, the embodiment provides a time domain pattern method. With this method, a node available for multiplexing can identify that a current channel is idle and available, and a node unavailable for multiplexing can identify that the channel is busy and unavailable.

The design of a time domain duration in the time domain pattern needs to meet at least one of the following features.

Feature one: the time domain duration (i.e., a length of a time domain resource or a length of a blank time domain resource) is not greater than (less than or equal to) a detection duration or sensing time of a node unavailable for multiplexing with the node. For example, detection duration or sensing time optionally is 4 us.

Feature two: the time domain duration should meet that a node with which the channel can be multiplexed can detect that the channel is idle.

Based on the above features, the designed time domain duration cannot be too short, because it will require high synchronization accuracy. Therefore, the limitation to the time domain duration may also be relaxed to some extent. The design of the time domain pattern is to enable a device with which multiplexing is available to detect the channel idleness, and enable the node with which multiplexing is not available unable to detect that the channel is available, i.e., the node with which multiplexing is not available detects that the channel is busy.

Optionally, the transmission node sends an occupation signal or a reservation signal in the blank between the time of performing the LBT successfully and a time of starting the transmission. For the occupation signal or reservation signal, a time interval may be reserved or blanked on the time domain. The length of the time interval is a duration of sensing or detecting the channel by the transmission node, optionally is 2 us, 3 us or 4 us. Optionally, a specific resource unit may be reserved or blanked on the frequency domain, or the whole frequency domain is blanked. The resource unit may be RE, RB, RBG or subband.

Optionally, if the duration of the reservation signal is greater than the blanked or reserved time domain duration, the blanked or reserved time domain duration may locate at a start position of sending the reservation signal before the transmission starting time or after performing the LBT successfully, or the blanked or reserved time domain duration may locate at a specific position in the reservation signal. Whether to send the reservation signal, the blanked or reserved time domain duration or the position of the blanked or reserved time domain duration may be determined by at least one of: predefinition, an appointment of the base station and the UE, notification by physical layer DCI signaling; or notification by higher layer RRC signaling.

In conclusion, according to the designed blank time domain duration, the transmission node with which the multiplexing is available not only can know at least one of the specific position time domain and the specific position frequency domain, but also can detect the channel idleness within its duration. The transmission node with which multiplexing is unavailable does not know the specific position of the blank time domain duration, so when performing channel busy/idle detection, the transmission node with which multiplexing is unavailable detects that the channel is busy.

In addition, during transmission, some time domain durations may also be blanked. The time domain durations are used by the transmission node available for multiplexing for performing the CCA detection, thereby obtaining that the channel is available.

Embodiment Eleven

For two scheduling manner, or adopting the two scheduling manner, this embodiment provides a two grant manner to implement an efficient contention based channel access.

The case of scheduling multiple subframes may be divided into several cases described below.

Case one: a single grant may schedule multiple consecutive subframes.

Case two: the single grant may schedule multiple non-consecutive subframes.

Case three: the single grant schedules one subframe, and scheduling of multiple consecutive subframes or scheduling of multiple non-consecutive subframes is implemented by sending multiple grants.

In addition, based on the foregoing scheduling manner, the scheduling grant information may carry the LBT type in at least one of the manners described above.

In a manner one, a first grant carries the LBT type and a second grant carries the LBT type. At least one of the two grants carries at least one of: scheduling information, information for triggering actual transmission, and a timing relationship value. Alternatively, the two grants do not carry any scheduling information. The LBT type adopted in actual transmission may be the LBT type indicated in the second grant or the LBT type indicated in the first grant. The advantage of adopting the LBT type indicated in the second grant is that the transmission node may be notified of a proper LBT type according to the actual scheduling or the position of transmission subframe or locating within or outside the MCOT. For example, the transmission subframes are located within the burst, or little gap is between a preceding subframe and a succeeding subframe, Cat2 LBT may be executed. In this case, it is assumed that the LBT type carried in the first grant is Cat4 LBT.

In a manner two, the first grant carries the LBT type and the second grant triggers the LBT type indicated the first grant to take effect. At least one of the two grants carries at least one of the scheduling information, information for triggering actual transmission, and the timing relationship value. Alternatively, the two grants do not carry any scheduling information.

In a manner three, the first grant carries the scheduling information and carries LBT indication information (i.e., at least one of a LBT mechanism, the LBT type and parameters corresponding to the LBT mechanism) or the LBT type, and the second grant triggers the actual transmission. The disadvantage of this manner is that the LBT type adopted for the transmission may not be optimal, and the advantage is that the signaling overhead is reduced.

In a manner four, the first grant carries the scheduling information and carries the LBT indication information (i.e., at least one of the LBT mechanism, the LBT type and parameters corresponding to the LBT mechanism) or the LBT type, and the second grant triggers at least one of the actual transmission and whether the LBT to take effect.

In a manner five, the first grant carries the scheduling information and carries the LBT indication information (i.e., at least one of the LBT mechanism, the LBT type and the parameters corresponding to the LBT mechanism) or the LBT type, and the second grant triggers the actual transmission and carries the LBT indication information. The second grant carries the LBT mechanism adopted for the actual transmission. In a manner six: the first grant carries the scheduling information and carries the LBT type or the LBT indication information, the second grant triggers the actual transmission and whether to execute the LBT. This manner may reduce the signaling overhead to some extent.

In a manner seven, the first grant carries the scheduling information and carries the LBT type or LBT indication information, the second grant triggers the actual transmission, and triggers at least one of whether to execute the LBT and indicating the LBT type. If the second grant carries the LBT type, the actual transmission adopts the LBT type indicated in the second grant at the time of the contention based access. Otherwise, if the second grant does not carry the LBT type, the LBT type indicated in the first grant is adopted. This manner is a compromise solution.

In a manner eight, the first grant carries the scheduling information without carrying the LBT indication information, and the second grant triggers the actual transmission and carries the LBT indication information or the LBT type. The LBT mechanism carried in the second grant is adopted for the actual transmission.

In a manner nine, the two grands both carry the LBT type. At least one of the two grants may carry or not carry the scheduling information, or trigger at least one of the actual transmission information and the timing relationship value. This manner may effectively update the LBT mechanism executed during the actual transmission, but has a certain signaling overhead.

If the first grant carries the scheduling information, the scheduling information includes at least one of: a RV version, a HARQ process ID, a start point symbol index or position of the transmission, an ending point symbol index or position of the transmission, a blank symbol gap, the number of symbols actually transmitted in one TTI, a MCS, a RB resource allocation, and a timing relationship value.

The information carried in the second grant includes at least one of: triggering information of the actual transmission, a timing relationship value, or at least one piece of information not notified in the first grant.

Figure 14:
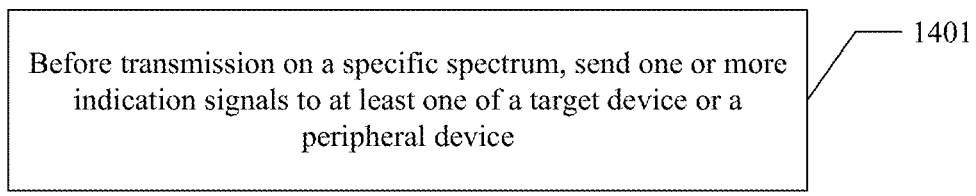
FIG. 14 is a flowchart of a signal transmission method according to an embodiment of the present disclosure.

An embodiment of the present disclosure further provides a signal transmission method. As shown in FIG. 14, the method includes:

In step S1401, before transmitting on a specific spectrum, one or more indication signals are sent to at least one of a target device or a peripheral device.

Optionally, the specific spectrum includes at least one of: a licensed spectrum, a shared spectrum, a partially shared spectrum and an unlicensed spectrum.

Optionally, the method further includes:
for the unlicensed spectrum, before at least one of data transmission and sending the indication signal, a LBT or a CCA detection mechanism is performed.

Optionally, at least one of a time domain position, a frequency domain position, a time-frequency domain position and a spatial domain resource position is determined by the following manners:
an appointment of a base station and a UE;
notification by a physical layer DCI signaling;
configuration by higher layer RRC signaling; and
predefinition.

Figure 15:
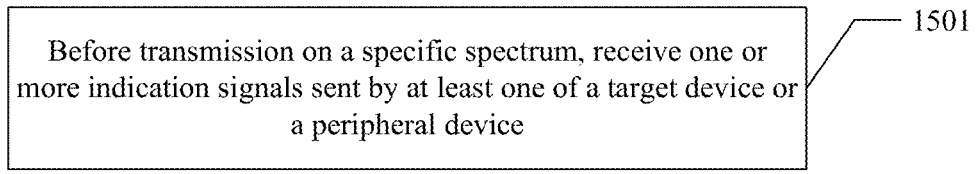
FIG. 15 is a flowchart of another signal transmission method according to an embodiment of the present disclosure.

An embodiment of the present disclosure further provides a signal transmission method. As shown in FIG. 15, the method includes:
before performing transmission on a specific spectrum, receiving one or more indication signals sent by at least one of a target device or a peripheral device.

Optionally, the method further includes:
evaluating, based on the received one or more indication signals, a current channel state, or a busy/idle state of the channel.

Optionally, the method further includes:
in determining that the channel state is idle or available, performing transmission;
in determining that the channel state is busy or unavailable, stopping the transmission; or
in determining that the channel state is busy or unavailable, adjusting a direction, a range or a power of a transmission beam.

Optionally, the specific spectrum includes at least one of: a licensed spectrum, a shared spectrum, a partially shared spectrum and an unlicensed spectrum.

Optionally, the method further includes:
for the unlicensed spectrum, before receiving the indication signal sent by the target device and/or the peripheral device, performing the LBT or the CCA detection mechanism.

Optionally, the method further includes:
in response to detecting that a channel state is busy or unavailable, sending a message to a sending device; or
in response to detecting that the channel state is idle or available, sending or not sending a message to the sending device.

Optionally, the method further includes:
after the indication signal sent by at least one of a sending device and/or the peripheral device is received, sending an indication signal to the sending device.

Optionally, at least one of a time domain position, a frequency domain position, a time-frequency domain position and a spatial domain resource position where the indication signal is sent is determined by the following manners:
an appointment of a base station and a UE;
notification through a physical layer DCI signaling;
configuration by higher layer RRC signaling; and
predefinition.

Figure 16:
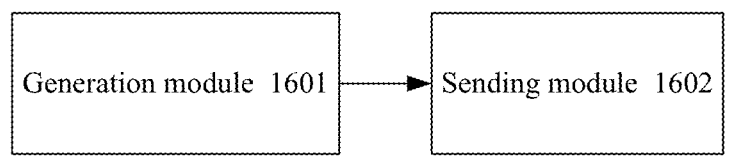
FIG. 16 is a structural diagram of a signal transmission device according to an embodiment of the present disclosure.

An embodiment of the present disclosure further provides a signal transmission device. As shown in FIG. 16, the device includes:
a generation module 1601, which is configured to generate an indication signal; and
a transmission module 1602, which is configured to before performing transmission on a specific spectrum, send one or more indication signals to at least one of a target device or a peripheral device.

Optionally, the specific spectrum includes at least one of: a licensed spectrum, a shared spectrum, a partially shared spectrum and an unlicensed spectrum.

Optionally, the device further includes:
a detection module, which is configured to, before at least one of performing transmission and sending an indication signal, perform a LBT or a CCA detection mechanism on the unlicensed spectrum.

Optionally, at least one of a time domain position, a frequency domain position, a time-frequency domain position and a spatial domain resource position where the indication signal is sent is determined by the following manners:
an appointment of a base station and a UE;
notification by physical layer DCI signaling;
configuration by higher layer RRC signaling; and
predefinition.

Figure 17:
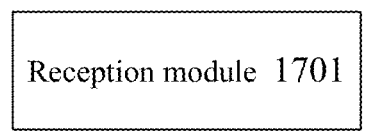
FIG. 17 is a structural diagram of another signal transmission device according to an embodiment of the present disclosure.

An embodiment of the present disclosure further provides a signal transmission device. As shown in FIG. 17, the device includes:
a reception module 1701, which is configured to: before perform transmission on a specific spectrum, receive one or more indication signals sent by at least one of a target device or a peripheral device.

Optionally, the device further includes:
an evaluation module, which is configured to evaluate, based on the received indication signal, a current channel state or a busy/idle state of a channel.

Optionally, the device further includes:
a transmission module, which is configured to: in determining that the channel state is idle or available, perform transmission;
in determining that the channel state is busy or unavailable, stop the transmission;
in determining that the channel state is busy or unavailable, adjust a direction, a range or a power of a transmission beam.

Optionally, the specific spectrum includes at least one of: a licensed spectrum, a shared spectrum, a partially shared spectrum and an unlicensed spectrum.

Optionally, the device further includes:
a detection module, which is configured to: before receiving the indication signal sent by at least one of the target device or the peripheral device, perform the LBT or the CCA detection mechanism on the unlicensed spectrum.

Optionally, the detection module is further configured to:
send a message to a sending device in response to detecting that the channel state is busy or unavailable; and
send or not send the message to the sending device in response to detecting that the channel state is idle or available.

Optionally, the device further includes:
a sending module, which is configured to: after the indication signal sent by at least one of a sending device and/or the peripheral device is received, send an indication signal to the sending device.

Optionally, at least one of a time domain position, a frequency domain position, a time-frequency domain position and a spatial domain resource position where the indication signal is sent is determined by the following manners:

an appointment of a base station and a UE;
notification by physical layer DCI signaling;
configuration by higher layer RRC signaling; and
predefinition.

An embodiment of the present disclosure further provides a computer-readable storage medium configured to store computer-executable instructions. When the computer-executable instructions are executed by a processor, the method in the above embodiments is implemented.

It should be understood by those skilled in the art that functional modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage media, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, communication media generally include computer-readable instructions, data structures, program modules, or other data in modulated data signals such as carriers or other transmission mechanisms, and may include any information delivery media. The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the protection scope of the claims.

INDUSTRIAL APPLICABILITY

Through the above embodiments, the problem of hidden nodes in a high frequency scenario can be alleviated to some extent, and transmission efficiency and system performance can be improved.

What is claimed is:

1. A transmission control method, comprising:
acquiring, by a transmission node or a transmission pair, a transmission opportunity on a preset spectrum; and
after acquiring a right to use the preset spectrum, performing, by the transmission node or the transmission pair, transmission on the acquired transmission opportunity;
wherein the method further comprises:
after the transmission node or transmission pair acquires the right to use the preset spectrum, reserving a specific time domain duration in the time domain, wherein the specific time domain duration reserved in the time domain meets at least one of following features:
feature one: the specific time domain duration is not greater than a detection duration or sensing time duration of a node not supporting multiplexing with the transmission node or the transmission pair; or
feature two: the specific time domain duration makes a node supporting multiplexing with the transmission node or transmission pair to detect that a channel is idle.

2. The method according to claim 1, wherein the transmission opportunities of different transmission nodes or transmission pairs on the preset spectrum are in a time division mode,
wherein when a first transmission node or a first transmission pair performs data transmission on the transmission opportunity, a second transmission node or a second transmission pair is woken up and performs at least one of an interference report generation or a CCA detection on the transmission opportunity of the first transmission node or the first transmission pair,
wherein when the second transmission node or the second transmission pair performs data transmission on the transmission opportunity, the first transmission node or the first transmission pair is woken up and performs at least one of the interference report generation or the CCA detection on the transmission opportunity of the second transmission node or the second transmission pair.

3. The method according to claim 1, wherein the transmission opportunity acquired by the transmission node or the transmission pair comprises:
scheduling or indicating a plurality of consecutive transmission opportunities by one grant; or
scheduling or indicating a plurality of non-consecutive transmission opportunities by one grant; or
scheduling or indicating a plurality of consecutive transmission opportunities by transmitting a plurality of grants wherein each grant schedules or indicates one transmission opportunity; or
scheduling or indicating a plurality of non-consecutive transmission opportunities by transmitting a plurality of grants wherein each grant schedules or indicates one transmission opportunity.

4. The method according to claim 3, further comprising: a listen before talk (LBT) type used by a CCA detection performed by the transmission node or the transmission pair before the transmission opportunity comprises:
indicating the LBT type in a manner of two grants.

5. The method according to claim 4, wherein the indicating the LBT type in the manner of two grants comprises:
indicating the LBT type in a first grant, and indicating the LBT type in a second grant; or indicating the LBT type in the first grant, and triggering, by the second grant, the LBT type indicated in the first grant to take effect; or indicating scheduling information and the LBT type in the first grant, and triggering an actual transmission by the second grant; or indicating the scheduling information and the LBT type in the first grant, and at least one of triggering the actual transmission by the second grant and triggering the LBT type indicated in the first grant to take effect by the second grant; or indicating the scheduling information and the LBT type in the first grant, and triggering the actual transmission and indicating the LBT type by the second grant; or indicating the scheduling information and the LBT type in the first grant, and triggering the actual transmission by the second grant and indicating or triggering whether to perform a LBT by the second grant; or indicating the scheduling information and the LBT type in the first grant, and at least one of triggering the actual transmission by the second grant, triggering whether to perform the LBT by the second grant, or indicating the LBT type by the second grant; or indicating the scheduling information without indicating the LBT type in the first grant, and triggering the actual transmission and indicating the LBT type in the second grant.

6. The method according to claim 5, wherein in response to determining that the two grants both indicate the LBT type, in the actual transmission, a contention access of a channel is performed according to the LBT type indicated by the second grant; or in response to determining that one of the two grants indicates the LBT type, in the actual transmission, the contention access of the channel is performed according to the LBT type indicated by the one of the two grants; or in response to determining that one of the two grants performs at least one of indicating the LBT type, triggering the indicated LBT type to take effect, and indicating whether to perform the LBT, in the actual transmission, the contention access of the channel is performed according to the LBT type indicated by the one of the two grants or the LBT type that has taken effect.

7. The method according to claim 6, wherein the scheduling information carried in the first grant comprises at least one of:

a redundancy version (RV), a hybrid automatic repeat request (HARQ) process identifier (ID), an index or position of a transmission start point, an index or position of a transmission ending point, a blank symbol gap, a number of actually transmitted symbols in one transmission time interval (TTI), a modulation and coding scheme (MCS), a resource block (RB) resource allocation, and a timing relationship value;

wherein information carried in the second grant comprises at least one of:

triggering information of the actual transmission, a timing relationship value, and at least one piece of information not notified in the first grant.

8. A communication device, being a transmission node or a transmission node of a transmission pair, comprising:

a processor, configured to acquire a transmission opportunity on a preset spectrum; and a transceiver, configured to, configured to perform transmission on the acquired transmission opportunity after that the processor acquires a right to use the preset spectrum;

wherein after the processor acquires the right to use the preset spectrum, the processor is configured to reserve a specific time domain duration in the time domain, wherein the specific time domain duration reserved in the time domain meets at least one of following features:

feature one: the specific time domain duration is not greater than a detection duration or sensing time duration of a node not supporting multiplexing with the transmission node or the transmission pair; or, feature two: the specific time domain duration makes a node supporting multiplexing with the transmission node or transmission pair to detect that a channel is idle.

9. The communication device according to claim 8, wherein the transmission opportunities of different transmission nodes or transmission pairs on the preset spectrum are in a time division mode, wherein when a first transmission node or a first transmission pair performs data transmission on the transmission opportunity, a second transmission node or a second transmission pair is woken up and performs at least one of an interference report generation or a CCA detection on the transmission opportunity of the first transmission node or the first transmission pair, wherein when the second transmission node or the second transmission pair performs data transmission on the transmission opportunity, the first transmission node or the first transmission pair is woken up and performs at least one of the interference report generation or the CCA detection on the transmission opportunity of the second transmission node or the second transmission pair.

10. The communication device according to claim 8, the processor is configured to:

schedule or indicate a plurality of consecutive transmission opportunities by one grant; or schedule or indicate a plurality of non-consecutive transmission opportunities by one grant; or schedule or indicate a plurality of consecutive transmission opportunities by transmitting a plurality of grants wherein each grant schedules or indicates one transmission opportunity; or schedule or indicate a plurality of non-consecutive transmission opportunities by transmitting a plurality of grants wherein each grant schedules or indicates one transmission opportunity.

11. The communication device according to claim 10, the processor is configured to indicate the LBT type in a manner of two grants.

12. The communication device according to claim 11, wherein the processor is configured to perform:

indicating the LBT type in a first grant, and indicating the LBT type in a second grant; or indicating the LBT type in the first grant, and triggering, by the second grant, the LBT type indicated in the first grant to take effect; or indicating scheduling information and the LBT type in the first grant, and triggering an actual transmission by the second grant; or indicating the scheduling information and the LBT type in the first grant, and at least one of triggering the actual transmission by the second grant and triggering the LBT type indicated in the first grant to take effect by the second grant; or indicating the scheduling information and the LBT type in the first grant, and triggering the actual transmission and indicating the LBT type by the second grant; or indicating the scheduling information and the LBT type in the first grant, and triggering the actual transmission by the second grant and indicating or triggering whether to perform a LBT by the second grant; or indicating the scheduling information and the LBT type in the first grant, and at least one of triggering the actual transmission by the second grant, triggering whether to perform the LBT by the second grant, or indicating the LBT type by the second grant; or indicating the scheduling information without indicating the LBT type in the first grant, and triggering the actual transmission and indicating the LBT type in the second grant.

13. The communication device according to claim 12, wherein in response to determining that the two grants both indicate the LBT type, in the actual transmission, a contention access of a channel is performed according to the LBT type indicated by the second grant; or in response to determining that one of the two grants indicates the LBT type, in the actual transmission, the contention access of the channel is performed according to the LBT type indicated by the one of the two grants; or in response to determining that one of the two grants performs at least one of indicating the LBT type, triggering the indicated LBT type to take effect, and indicating whether to perform the LBT, in the actual transmission, the contention access of the channel is performed according to the LBT type indicated by the one of the two grants or the LBT type that has taken effect.

14. The communication device according to claim 13, wherein the scheduling information carried in the first grant comprises at least one of:

a redundancy version (RV), a hybrid automatic repeat request (HARQ) process identifier (ID), an index or position of a transmission start point, an index or position of a transmission ending point, a blank symbol gap, a number of actually transmitted symbols in one transmission time interval (TTI), a modulation and coding scheme (MCS), a resource block (RB) resource allocation, and a timing relationship value;

wherein information carried in the second grant comprises at least one of:

triggering information of the actual transmission, a timing relationship value, and at least one piece of information not notified in the first grant.

15. A non-transitory storage medium, storing a computer program, wherein the computer program, when executed by a processor to perform:

acquiring, by a transmission node or a transmission pair, a transmission opportunity on a preset spectrum; and after acquiring a right to use the preset spectrum, performing, by the transmission node or the transmission pair, transmission on the acquired transmission opportunity;

wherein after the processor acquires the right to use the preset spectrum, the processor is configured to reserve a specific time domain duration in the time domain, wherein the specific time domain duration reserved in the time domain meets at least one of following features:

feature one: the specific time domain duration is not greater than a detection duration or sensing time duration of a node not supporting multiplexing with the transmission node or the transmission pair; or feature two: the specific time domain duration makes a node supporting multiplexing with the transmission node or transmission pair to detect that a channel is idle.

16. The non-transitory storage medium according to claim 15, wherein the transmission opportunities of different transmission nodes or transmission pairs on the preset spectrum are in a time division mode, wherein when a first transmission node or a first transmission pair performs data transmission on the transmission opportunity, a second transmission node or a second transmission pair is woken up and performs at least one of an interference report generation or a CCA detection on the transmission opportunity of the first transmission node or the first transmission pair, wherein when the second transmission node or the second transmission pair performs data transmission on the transmission opportunity, the first transmission node or the first transmission pair is woken up and performs at least one of the interference report generation or the CCA detection on the transmission opportunity of the second transmission node or the second transmission pair.

17. The non-transitory storage medium according to claim 15, the processor is configured to:

schedule or indicate a plurality of consecutive transmission opportunities by one grant; or schedule or indicate a plurality of non-consecutive transmission opportunities by one grant; or schedule or indicate a plurality of consecutive transmission opportunities by transmitting a plurality of grants wherein each grant schedules or indicates one transmission opportunity; or schedule or indicate a plurality of non-consecutive transmission opportunities by transmitting a plurality of grants wherein each grant schedules or indicates one transmission opportunity.

18. The non-transitory storage medium according to claim 17, the processor is configured to indicate the LBT type in a manner of two grants.

19. The non-transitory storage medium according to claim 18, wherein the processor is configured to perform:

indicating the LBT type in a first grant, and indicating the LBT type in a second grant; or indicating the LBT type in the first grant, and triggering, by the second grant, the LBT type indicated in the first grant to take effect; or indicating scheduling information and the LBT type in the first grant, and triggering an actual transmission by the second grant; or indicating the scheduling information and the LBT type in the first grant, and at least one of triggering the actual transmission by the second grant and triggering the LBT type indicated in the first grant to take effect by the second grant; or indicating the scheduling information and the LBT type in the first grant, and triggering the actual transmission and indicating the LBT type by the second grant; or indicating the scheduling information and the LBT type in the first grant, and triggering the actual transmission by the second grant and indicating or triggering whether to perform a LBT by the second grant; or indicating the scheduling information and the LBT type in the first grant, and at least one of triggering the actual transmission by the second grant, triggering whether to perform the LBT by the second grant, or indicating the LBT type by the second grant; or indicating the scheduling information without indicating the LBT type in the first grant, and triggering the actual transmission and indicating the LBT type in the second grant.

20. The non-transitory storage medium according to claim 19, wherein in response to determining that the two grants both indicate the LBT type, in the actual transmission, a contention access of a channel is performed according to the LBT type indicated by the second grant; or in response to determining that one of the two grants indicates the LBT type, in the actual transmission, the contention access of the channel is performed according to the LBT type indicated by the one of the two grants; or in response to determining that one of the two grants performs at least one of indicating the LBT type, triggering the indicated LBT type to take effect, and indicating whether to perform the LBT, in the actual transmission, the contention access of the channel is performed according to the LBT type indicated by the one of the two grants or the LBT type that has taken effect.

* * * * *